(12) United States Patent
Jorgensen et al.

(10) Patent No.: US 12,319,048 B2
(45) Date of Patent: Jun. 3, 2025

(54) SHEET, MOISTURE-PROOF METHOD OF ADHEREND USING THE SHEET AND CORROSION-PROOF METHOD OF METAL PLATE USING THE SHEET

(71) Applicants: Nitto Denko Corporation, Osaka (JP); NITTO, INC., Lakewood, NJ (US)

(72) Inventors: Derek Jorgensen, Lakewood, NJ (US); Shinji Hoshino, Osaka (JP); Yu-chu Chen, Lakewood, NJ (US); Masatoshi Suzuki, Osaka (JP)

(73) Assignees: NITTO DENKO CORPORATION, Osaka (JP); NITTO, INC., Lakewood, NJ (US)

( * ) Notice: Subject to any disclaimer, the term of this patent is extended or adjusted under 35 U.S.C. 154(b) by 101 days.

(21) Appl. No.: 17/473,026

(22) Filed: Sep. 13, 2021

(65) Prior Publication Data

US 2021/0402738 A1    Dec. 30, 2021

Related U.S. Application Data

(60) Division of application No. 16/837,174, filed on Apr. 1, 2020, now abandoned, which is a continuation of
(Continued)

(51) Int. Cl.
*B32B 7/10* (2006.01)
*B32B 5/02* (2006.01)
(Continued)

(52) U.S. Cl.
CPC .................. *B32B 7/10* (2013.01); *B32B 5/02* (2013.01); *B32B 7/00* (2013.01); *B32B 7/06* (2013.01);
(Continued)

(58) Field of Classification Search
CPC ......... B32B 15/06; B32B 15/08; B32B 15/18; B32B 15/20; B32B 2037/268;
(Continued)

(56) References Cited

U.S. PATENT DOCUMENTS 2,882,183 A    4/1959   Bond et al.
4,242,418 A *  12/1980  Kitagawa ................ G03C 1/79
                                                428/512
(Continued)

FOREIGN PATENT DOCUMENTS

CN    1303244        7/2001
CN    1468169 A  *  1/2004  ............. B32B 15/06
(Continued)

OTHER PUBLICATIONS

English translation of CN1303244.*
(Continued)

*Primary Examiner* — Sonya M Sengupta
(74) *Attorney, Agent, or Firm* — Wenderoth, Lind & Ponack, L.L.P.

(57) ABSTRACT

The present invention provides a sheet having an elastomer layer having a Shore A hardness of less than 40, wherein the elastomer layer has an adhesion force to stainless steel of not more than 11 oz/in at 90 degree peel strength.

16 Claims, 6 Drawing Sheets

Related U.S. Application Data application No. 15/563,761, filed as application No. PCT/US2016/026361 on Apr. 7, 2016, now abandoned.

(60) Provisional application No. 62/144,536, filed on Apr. 8, 2015.

(51) Int. Cl.

| | | |
|---|---|---|
| *B32B 7/00* | (2019.01) | |
| *B32B 7/06* | (2019.01) | |
| *B32B 7/12* | (2006.01) | |
| *B32B 7/14* | (2006.01) | |
| *B32B 15/06* | (2006.01) | |
| *B32B 15/08* | (2006.01) | |
| *B32B 15/18* | (2006.01) | |
| *B32B 15/20* | (2006.01) | |
| *B32B 25/06* | (2006.01) | |
| *B32B 25/08* | (2006.01) | |
| *B32B 25/10* | (2006.01) | |
| *B32B 25/20* | (2006.01) | |
| *B32B 27/08* | (2006.01) | |
| *B32B 27/10* | (2006.01) | |
| *B32B 27/12* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *B32B 38/10* | (2006.01) | |
| *C09J 7/22* | (2018.01) | |
| *C09J 7/30* | (2018.01) | |
| *C09J 171/02* | (2006.01) | |
| *B32B 37/26* | (2006.01) | |
| *B64C 1/18* | (2006.01) | |

(52) U.S. Cl.
CPC ............... *B32B 7/12* (2013.01); *B32B 7/14* (2013.01); *B32B 15/06* (2013.01); *B32B 15/08* (2013.01); *B32B 15/18* (2013.01); *B32B 15/20* (2013.01); *B32B 25/06* (2013.01); *B32B 25/08* (2013.01); *B32B 25/10* (2013.01); *B32B 25/20* (2013.01); *B32B 27/08* (2013.01); *B32B 27/10* (2013.01); *B32B 27/12* (2013.01); *B32B 27/304* (2013.01); *B32B 27/32* (2013.01); *B32B 27/322* (2013.01); *B32B 27/34* (2013.01); *B32B 27/36* (2013.01); *B32B 38/10* (2013.01); *C09J 7/22* (2018.01); *C09J 7/30* (2018.01); *C09J 171/02* (2013.01); *B32B 2037/268* (2013.01); *B32B 2255/26* (2013.01); *B32B 2262/0276* (2013.01); *B32B 2262/101* (2013.01); *B32B 2274/00* (2013.01); *B32B 2307/50* (2013.01); *B32B 2307/536* (2013.01); *B32B 2307/54* (2013.01); *B32B 2307/5825* (2013.01); *B32B 2307/714* (2013.01); *B32B 2307/7265* (2013.01); *B32B 2307/732* (2013.01); *B32B 2307/748* (2013.01); *B32B 2311/00* (2013.01); *B32B 2319/00* (2013.01); *B32B 2327/12* (2013.01); *B32B 2405/00* (2013.01); *B32B 2419/00* (2013.01); *B32B 2419/04* (2013.01); *B32B 2471/00* (2013.01); *B32B 2605/00* (2013.01); *B32B 2605/08* (2013.01); *B32B 2605/18* (2013.01); *B32B 2607/00* (2013.01); *B64C 1/18* (2013.01); *C09J 2203/314* (2013.01); *C09J 2301/1242* (2020.08); *C09J 2301/312* (2020.08); *C09J 2427/006* (2013.01); *C09J 2471/00* (2013.01); *C09J 2475/00* (2013.01); *C09J 2483/00* (2013.01); *Y10T 428/1476* (2015.01); *Y10T 428/28* (2015.01); *Y10T 428/2848* (2015.01)

(58) Field of Classification Search
CPC ........ B32B 2255/26; B32B 2262/0276; B32B 2262/101; B32B 2274/00; B32B 2307/50; B32B 2307/536; B32B 2307/54; B32B 2307/5825; B32B 2307/714; B32B 2307/726; B32B 2307/732; B32B 2307/74; B32B 2311/00; B32B 2319/00; B32B 2327/12; B32B 2405/00; B32B 2419/00; B32B 2419/04; B32B 2471/00; B32B 25/06; B32B 25/08; B32B 25/10; B32B 25/20; B32B 2605/00; B32B 2605/08; B32B 2605/18; B32B 2607/00; B32B 27/08; B32B 27/10; B32B 27/12; B32B 27/304; B32B 27/32; B32B 27/322; B32B 27/34; B32B 27/36; B32B 38/10; B32B 5/02; B32B 7/00; B32B 7/06; B32B 7/10; B32B 7/12; B32B 7/14; B64C 1/18; C09J 171/02; C09J 2203/314; C09J 2301/1242; C09J 2301/312; C09J 2427/006; C09J 2471/00; C09J 2475/00; C09J 2483/00; C09J 7/22; C09J 7/30; Y10T 428/1476; Y10T 428/28; Y10T 428/2848

See application file for complete search history.

(56) References Cited

U.S. PATENT DOCUMENTS

| | | | |
|---|---|---|---|
| 6,316,073 B1* | 11/2001 | Hiscock | G09F 3/10 428/68 |
| 6,878,440 B1 | 4/2005 | Yamanaka et al. | |
| 2004/0025462 A1* | 2/2004 | Meier | E04F 13/06 52/412 |
| 2004/0070156 A1 | 4/2004 | Smith et al. | |
| 2004/0122142 A1 | 6/2004 | Meguriya | |
| 2009/0117379 A1 | 5/2009 | Toyoshima et al. | |
| 2009/0322040 A1 | 12/2009 | Banba et al. | |
| 2010/0035501 A1 | 2/2010 | Prudhomme et al. | |
| 2010/0043608 A1 | 2/2010 | Jakob | |
| 2010/0310805 A1 | 12/2010 | Ou et al. | |
| 2011/0070795 A1 | 3/2011 | Prudhomme et al. | |
| 2011/0097576 A1 | 4/2011 | Habu et al. | |
| 2011/0156353 A1 | 6/2011 | Kabutoya et al. | |
| 2012/0034407 A1 | 2/2012 | Yamanaka et al. | |
| 2012/0064325 A1 | 3/2012 | Fumoto et al. | |
| 2013/0337261 A1 | 12/2013 | Muta et al. | |
| 2014/0023858 A1 | 1/2014 | Igarashi et al. | |
| 2014/0174654 A1 | 6/2014 | Kabutoya et al. | |
| 2014/0178683 A1 | 6/2014 | Kabutoya et al. | |
| 2014/0349053 A1* | 11/2014 | Burke | C09J 175/04 428/41.3 |
| 2015/0267399 A1 | 9/2015 | Uno et al. | |
| 2016/0376470 A1 | 12/2016 | Hirose et al. | |
| 2018/0093451 A1 | 4/2018 | Jorgensen | |
| 2018/0267399 A1 | 9/2018 | Quaglio et al. | |
| 2021/0402738 A1* | 12/2021 | Jorgensen | B32B 25/08 |

FOREIGN PATENT DOCUMENTS

| | | |
|---|---|---|
| CN | 101189317 | 5/2008 |
| CN | 101835862 | 9/2010 |
| CN | 103571353 | 2/2014 |
| CN | 103897616 | 7/2014 |
| CN | 103897619 | 7/2014 |
| EP | 2 141 015 | 1/2010 |
| EP | 2 666 836 | 11/2013 |
| JP | 2002-129114 | 5/2002 |
| JP | 2003-503249 | 1/2003 |

(56) References Cited

FOREIGN PATENT DOCUMENTS

| JP | 2003-115501 | 4/2003 |
|---|---|---|
| JP | 2004-189945 | 7/2004 |
| JP | 2007-37900 | 2/2007 |
| JP | 2010-274042 | 12/2010 |
| JP | 4766947 | 9/2011 |
| JP | 2012-529540 | 11/2012 |
| JP | 2014-125636 | 7/2014 |
| WO | 01/02189 | 1/2001 |
| WO | 2010/144444 | 12/2010 |
| WO | 2014/179336 | 11/2014 |
| WO | 2015/005388 | 1/2015 |

OTHER PUBLICATIONS

English translation of written opinion of JP2017541638.*
English translation of written opinion of WO201616435.*
English translation of WO2014179336.*
Translation of CN1050376.*
Translation of CN1468169.*
Translation of KR101249708.*
Translation of WO0228635.*
Examination Report issued Jun. 4, 2018 in Singapore Application No. 11201706923S.
Extended European Search Report issued Sep. 25, 2018 in European Application No. 16777249.0.
International Preliminary Report on Patentability and Written Opinion of the International Searching Authority issued Oct. 10, 2017 in International (PCT) Application No. PCT/US2016/026361.
Notice of Reasons for Refusal issued Jan. 19, 2021 in corresponding Japanese Patent Application No. 2017-541638, with English translation.
Office Action issued Apr. 19, 2019 in corresponding Chinese Patent Application No. 201680020402.5, with English Translation.
Office Action issued Apr. 21, 2020 in corresponding Japanese Patent Application No. 2017-541638, with English Translation.
International Search Report issued Jul. 8, 2016 in International (PCT) Application No. PCT/US2016/026361.

* cited by examiner

SHEET, MOISTURE-PROOF METHOD OF ADHEREND USING THE SHEET AND CORROSION-PROOF METHOD OF METAL PLATE USING THE SHEET

TECHNICAL FIELD OF THE INVENTION

The present invention relates to a novel sheet simultaneously having superior adhesiveness to an adherend and superior re-peel property.

BACKGROUND OF THE INVENTION

For example, carpets of various materials and forms are generally laid on the floor panel of aircrafts for the purpose of walking ease, beauty, heat-retaining property and the like. On the other hand, since electrical components, electric wiring and the like are set under the floor panel, it is necessary to shut off the moisture and humidity from the floor panel so that the moisture will not penetrate under the floor panel. The airframe constructional material under a floor panel (hereinafter to be also simply abbreviated as "constructional material") cannot be easily exchanged during maintenance, and corrosion needs to be prevented even when moisture penetrates under the floor panel. Particularly, since floor panel and airframe constructional material of aircraft cargo room are more frequently exposed to moisture than those of the cabin, the anticorrosion property of the airframe constructional material of aircraft cargo room poses a more important problem. However, since the floor panel is fixed onto the body frame by bolting, it is difficult to completely prevent moisture permeation from the clearance between a bolt and a screw hole formed for bolting a floor panel, even when the bolt is screwed into the screw hole. For this reason, an adhesive tape with high moisture-proof property is adhered to a floor panel and a carpet is laid thereon to shut off the floor panel from water and humidity. As an adhesive tape with high moisture-proof property, for example, an adhesive tape using a polyether-based polyurethane is known (US2004/0070156 A1).

SUMMARY OF THE INVENTION

As the basic property of an adhesive tape used for the aforementioned application, superior adhesion to adherends is necessary to isolate floor panel and airframe constructional material as adherends from water and humidity (hereinafter "isolation from water and humidity" is also simply referred to as "moisture-proof") and to prevent corrosion thereof. Although not clearly indicated in US2004/0070156 A1, for efficiency of the maintenance work of a floor panel, or a floor panel and a constructional material, and reuse of a floor panel after maintenance, an adhesive tape requires easy removability that permits easy re-peeling from an adherend (floor panel, constructional material etc.), and absence of development of an adhesive residue on peeling. Also, in an adhering work of an adhesive tape to a floor panel, a constructional material etc., it is not always easy to adhere an adhesive tape in a uniform manner to desired part of a floor panel (or constructional material) without enclosing air between the tape and the floor panel (or constructional material), and re-adhering (once peeling and adhering again) is often performed. From the aspects of suppression of property decrease (degradation) of the adhesive tape due to re-adhering of the tape, efficiency of adhesion work of an adhesive tape (including re-adhesion) and the like, and easy removability is particularly important.

In view of the above-mentioned situation, the present invention aims to provide a novel sheet simultaneously having superior adhesion to an adherend and superior re-peel property.

Generally, as a narrow "sheet" is called a "tape", the "sheet" in the present invention also encompasses a "tape" according to usual practice.

The present inventors have conducted intensive studies and found that a sheet wherein at least one of the surface layers is constituted of an elastomer layer having a Shore A hardness of less than 40, and the elastomer layer has an adhesion force to stainless steel of not more than 11 oz/in at 90 degree peel strength can solve the above-mentioned problems, which resulted in the completion of the present invention.

Therefore, the present invention provides the following.

[1] A sheet having an elastomer layer having a Shore A hardness of less than 40, wherein the elastomer layer has an adhesion force to stainless steel of not more than 11 oz/in at 90 degree peel strength.

[2] The sheet of the above-mentioned [1], having a laminate constitution of elastomer layer having a Shore A hardness of less than 40/core material/pressure-sensitive adhesive layer.

[3] The sheet of the above-mentioned [2], which is a double-faced adhesive sheet wherein a release liner is further laminated on the elastomer layer having a Shore A hardness of less than 40.

[4] The sheet of the above-mentioned [2], which is a double-faced adhesive sheet wherein a release liner is further laminated on the pressure-sensitive adhesive layer.

[5] The sheet of the above-mentioned [2], wherein the core material is a plastic film.

[6] The sheet of the above-mentioned [2], wherein the core material is a nonporous film.

[7] The sheet of the above-mentioned [2], wherein the core material is a fluororesin film.

[8] The sheet of the above-mentioned [1], having a laminate constitution of elastomer layer having a Shore A hardness of less than 40/core material/elastomer layer having a Shore A hardness of less than 40.

[9] The sheet of the above-mentioned [8], which is a double-faced adhesive sheet wherein a release liner is further laminated on one of the elastomer layers having a Shore A hardness of less than 40.

[10] The sheet of the above-mentioned [8], which is a single-faced adhesive sheet wherein a substrate is further laminated on one of the elastomer layers having a Shore A hardness of less than 40.

[11] The sheet of the above-mentioned [8], wherein the core material is a plastic film.

[12] The sheet of the above-mentioned [8], wherein the core material is a nonporous film.

[13] The sheet of the above-mentioned [8], wherein the core material is a fluororesin film.

[14] The sheet of the above-mentioned [1], wherein the elastomer layer having a Shore A hardness of less than 40 is a silicone rubber layer or urethane rubber layer having a Shore A hardness of less than 40.

[15] The sheet of the above-mentioned [2], wherein the pressure-sensitive adhesive layer is a polyoxyalkylene-based adhesive layer.

[16] A moisture-proof method of an adherend, comprising adhering the sheet of the above-mentioned [1] to the adherend, with the elastomer layer having a Shore A hardness of less than 40 of the sheet as an adhesive surface to the adherend.

[17] The method of the above-mentioned [16], wherein the adherend is a floor panel and/or a constructional material in a transporter or structure.

[18] The method of the above-mentioned [16], comprising, after said method, peeling the sheet from the adherend, performing said method using the peeled sheet, or using a newly prepared sheet of the above-mentioned [1].

[19] A corrosion-proof method of a metal plate, comprising adhering the sheet of the above-mentioned [1] to the metal plate, with the elastomer layer having a Shore A hardness of less than 40 of the sheet as an adhesive surface to the metal plate.

According to the sheet of the present invention, by adhering, to an adherend, the sheet with the elastomer layer having a Shore A hardness of less than 40 of the sheet as an adhesive surface to the adherend, the adherend can be placed in a superior close adhesion state to be isolated from humidity and water (including salt water). Therefore, an adherend in need of moisture-proof such as a floor panel of a transporter such as aircraft, boats and ships and the like, structure and the like, and a constructional material under a floor panel of an aircraft and the like can be isolated from humidity and water (including salt water) for a long term by adhering the sheet of the present invention to the adherend. In addition, since an adherend can be isolated from humidity and water (including salt water) for a long term, corrosion and discoloration of such sealed object can be prevented at a high level.

In addition, the sheet adhered to the adherend can be easily peeled off from the adherend. Therefore, a decrease (degradation) in the property of the sheet due to the peeling of the sheet can be suppressed, and the sheet can be reused. Since re-adhesion (once peeling and adhering again) in adhering work of a sheet can be performed rapidly, adhesion work of an adhesive tape (including re-doing of adhesion) can be performed efficiently.

When the sheet of the present invention is a sheet of an embodiment including a laminate constitution of elastomer layer having a Shore A hardness of less than 40/core material/pressure-sensitive adhesive layer, for example, moisture-proof of a floor panel and an airframe constructional material can be achieved, and a floor panel and an airframe constructional material can be temporarily fixed (permanently fixed by fastening screw after temporary fixing) by adhering the surface of an elastomer layer having a Shore A hardness of less than 40 to the floor panel, and adhering the surface of the pressure-sensitive adhesive layer to the airframe constructional material. Particularly, in the case of a sheet wherein a release liner is laminated on an elastomer layer having a Shore A hardness of less than 40, a pressure-sensitive adhesive layer having the release liner is adhered to the floor panel, and the release liner is peeled off, the floor panel is placed on and pressed against an airframe constructional material with the elastomer layer having a Shore A hardness of less than 40 being opposed to the airframe constructional material, whereby the floor panel and airframe constructional material become moisture-proof and the floor panel can be simultaneously laid on the airframe constructional material. Therefore, a floor panel laying work can be performed efficiency. A technique including adhering a pressure-sensitive adhesive layer to an airframe constructional material in advance and mounting a floor panel on an elastomer layer is also possible.

In the Figures, 1 is an elastomer layer having a Shore A hardness of less than 40, 2 is a core material, 3 is a pressure-sensitive adhesive layer, 4 is a release liner, 5 is a substrate, 10-15 are sheets, and 51-56 are rolls.

DETAILED DESCRIPTION OF THE INVENTION

The present invention is explained in the following by referring to preferable embodiments.

The sheet of the present invention is mainly characterized in that it has an elastomer layer having a Shore A hardness of less than 40, and the adhesion force of the elastomer layer to stainless steel is not more than 11 oz/in at 90 degree peel strength.

That is, the present invention has found that a sheet constituted to have an elastomer layer having a Shore A hardness of less than 40, wherein the elastomer layer having a Shore A hardness of less than 40 has an adhesion force to stainless steel of not more than 11 oz/in at 90 degree peel strength, can be a sheet showing superior adhesion to an adherend and superior re-peel property from the adherend, by adhering the sheet to the adherend, with the elastomer layer having a Shore A hardness of less than 40 as an adhesive surface to the adherend.

In the sheet of the present invention, the Shore A hardness of the elastomer layer is measured according to ASTM D2240.

That is, an elastomer press cured in a size of 6 in×6 in×0.07 at 177° C. for 5 min is used as a sample, ASKER Durometer Type A is pressed on the surface of the sample, and the value is taken as Shore A hardness.

The 90 degree peel strength which is an adhesion force to stainless steel of the elastomer layer is measured according to ASTM D1000.

That is, a sample (a sheet cut into 1 inch width) is adhered to a SUS304 polished plate manufactured by Chemsultants International at room temperature by one reciprocation press with a 2 kgf roller and, after leaving for 30 min at room temperature from the adhesion, and the peel strength is measured at peel angle 90°, peel rate 2 in/min.

The surface of the polished plate is washed with gauze containing toluene, toluene is dried at room temperature and plate is adhered to a sample.

Figure 1A:
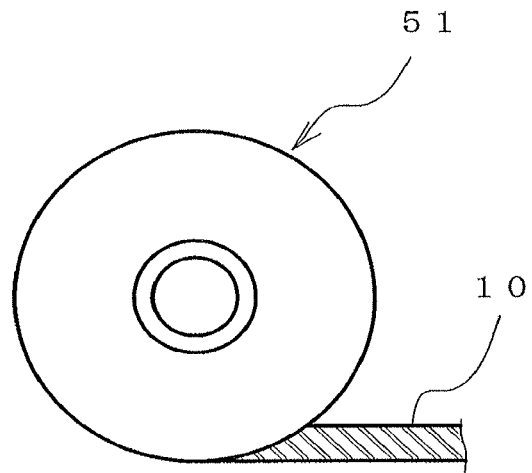
FIG. 1(A) is a schematic view of a roll shape of the sheet in the first form of the present invention.
Figure 1B:
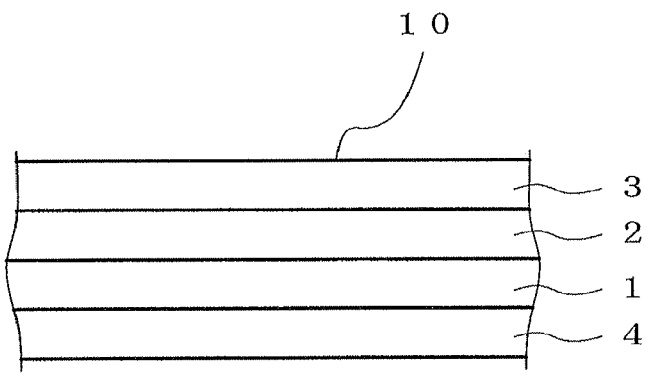
FIG. 1(B) is a partly-enlarged sectional view of the sheet shown in FIG. 1(A).
Figure 2A:
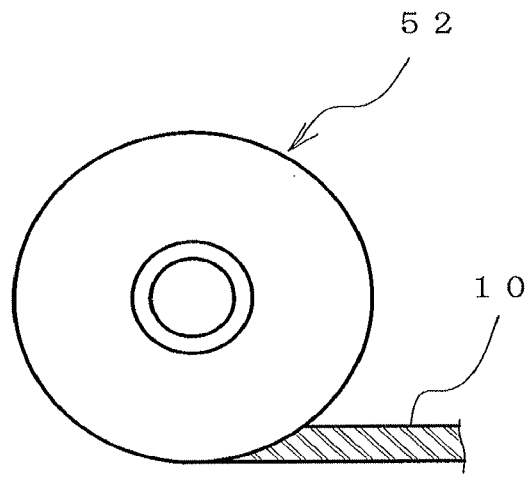
FIG. 2(A) is a schematic view of a roll shape of the sheet in the first form of the present invention.
Figure 2B:
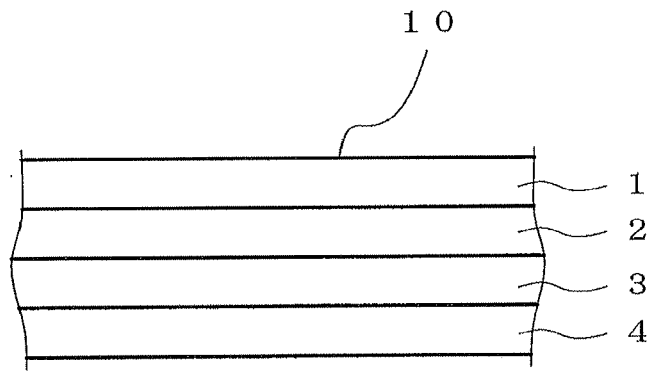
FIG. 2(B) is a partly-enlarged sectional view of the sheet shown in FIG. 2(A).

FIG. 1(B), FIG. 2(B) show sheet 10 in the first form. Sheet 10 has a laminate constitution of elastomer layer 1 having a Shore A hardness of less than 40/core material 2/pressure-sensitive adhesive layer 3. Sheet 10 in the first form before use, that is, before adhering sheet 10 to an adherend, is generally roll 51 wherein an elastomer layer 1 having a Shore A hardness of less than 40 further laminated with a release liner 4 (FIG. 1(B)) is rolled up (FIG. 1(A)), or roll 52 wherein a pressure-sensitive adhesive layer 3 further laminated with a release liner 4 is laminated (FIG. 2(B)) is rolled up (FIG. 2(A)).

Figure 3A:
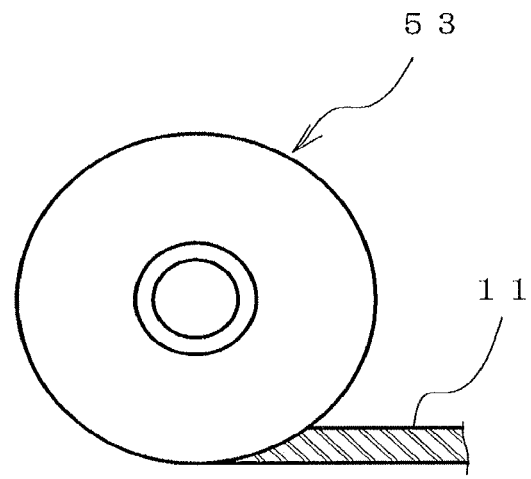
FIG. 3(A) is a schematic view of a roll shape of the sheet in the second form of the present invention.
Figure 3B:
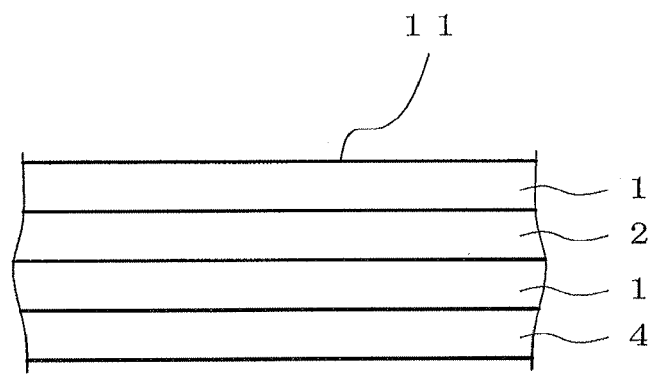
FIG. 3(B) is a partly-enlarged sectional view of the sheet shown in FIG. 3(A).

FIG. 3(B) shows sheet 11 in the second form. Sheet 11 is a laminate having a laminate constitution of elastomer layer 1 having a Shore A hardness of less than 40/core material 2/elastomer layer 1 having a Shore A hardness of less than 40. Sheet 11 in the second form before use, that is, before adhering sheet 11 to an adherend, is generally roll 53 wherein one of the elastomer layers 1 having a Shore A hardness of less than 40 further laminated with a release liner 4 (FIG. 3(B)) is rolled up.

Figure 4A:
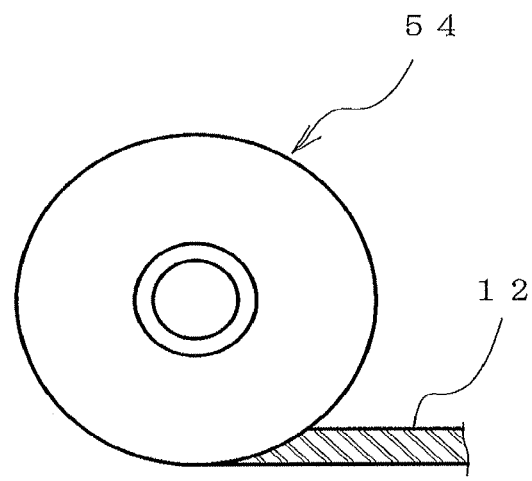
FIG. 4(A) is a schematic view of a roll shape of the sheet in the third form of the present invention.
Figure 4B:
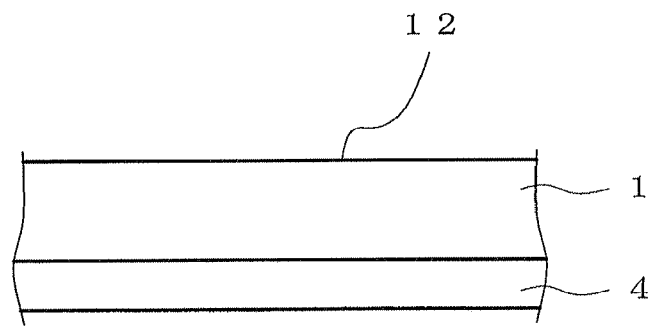
FIG. 4(B) is a partly-enlarged sectional view of the sheet shown in FIG. 4(A).

FIG. 4(B) shows sheet 12 in the third form. Sheet 12 is a single layer sheet having only an elastomer layer 1 having a Shore A hardness of less than 40. Sheet 12 in the third form before use, that is, before adhering sheet 12 to an adherend, is generally roll 54 wherein an elastomer layer 1 having a Shore A hardness of less than 40 further laminated with a release liner 4 (FIG. 4(B)) is rolled up.

Sheets 10-12 in the first—the third forms are what is called "double-faced adhesive sheets" wherein the double faces of the sheet become adhesive surfaces to an adherend. The sheet of the present invention also includes what is called a "single-faced adhesive sheet" wherein only single face of the sheet is an adhesive surface to an adherend. As such single-faced adhesive sheet, sheets in the following form can be mentioned.

Figure 5A:
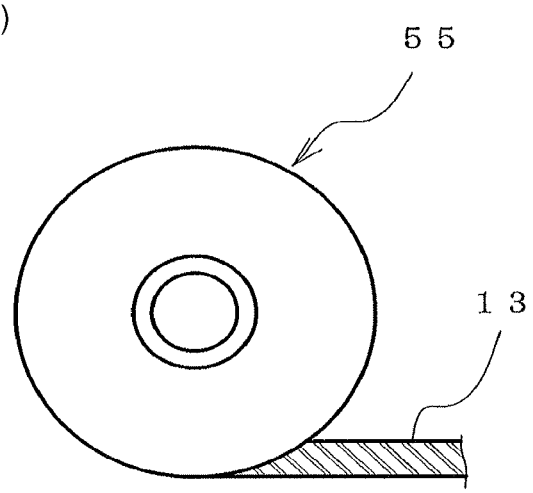
FIG. 5(A) is a schematic view of a roll shape of the sheet in the fourth form of the present invention.
Figure 5B:
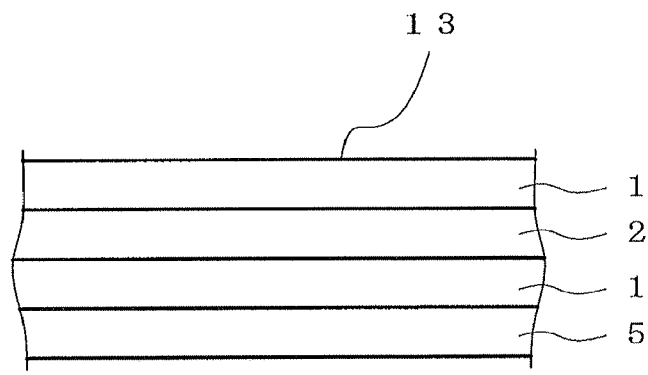
FIG. 5(B) is a partly-enlarged sectional view of the sheet shown in FIG. 5(A).

FIG. 5(B) shows sheet 13 in the fourth form. Sheet 13 has a laminate constitution of elastomer layer 1 having a Shore A hardness of less than 40/core material 2/elastomer layer 1 having a Shore A hardness of less than 40/substrate 5. Sheet 13 in the fourth form before use, that is, before adhering sheet 13 to an adherend, is roll 55 which is rolled up with substrate 5 on the outside face (FIG. 5(A)).

Figure 6A:
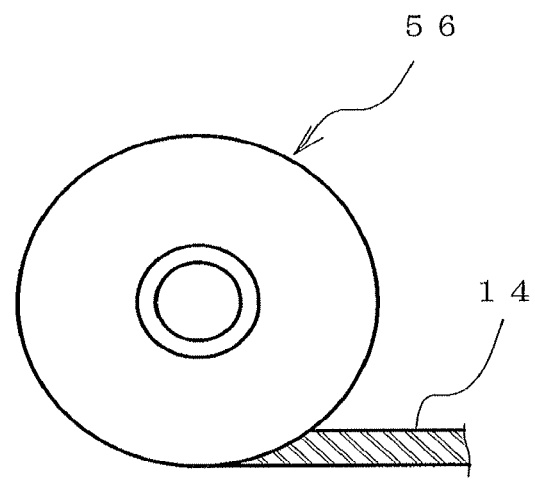
FIG. 6(A) is a schematic view of a roll shape of the sheet in the fifth form of the present invention.
Figure 6B:
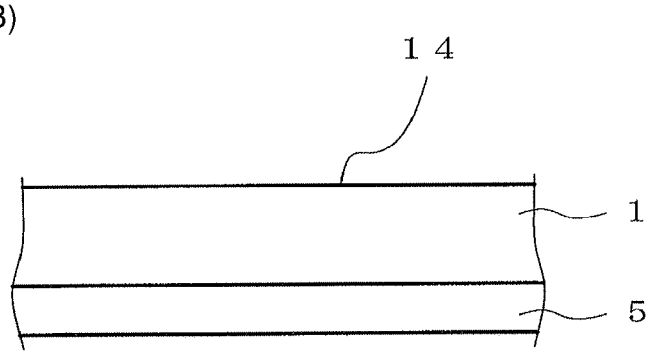
FIG. 6(B) is a partly-enlarged sectional view of the sheet shown in FIG. 6(A).

FIG. 6(B) shows sheet 14 in the fifth form. Sheet 14 has a laminate constitution of elastomer layer 1 having a Shore A hardness of less than 40/substrate 5. Sheet 14 in the fifth form before use, that is, before adhering sheet 14 to an adherend, is roll 56 which is rolled up with substrate 5 on the outside face (FIG. 6(A)).

The sheet of the present invention is used by adhering an elastomer layer having a Shore A hardness of less than 40 to an adherend that should certain become moisture-proof. An elastomer layer having a Shore A hardness of less than 40 is adhered to an adherend to place same in a superior close adhesion state capable of isolating the adherend from humidity and water (including salt water). Therefore, an adherend in need of moisture-proof such as a floor panel of a transporter such as aircraft, boats and ships and the like, structure and the like, and a constructional material under a floor panel of an aircraft and the like can be isolated from humidity and water (including salt water) for a long term by adhering the sheet of the present invention to the adherend. In addition, since an adherend can be isolated from humidity and water (including salt water) for a long term, corrosion and discoloration of such sealed object can be prevented at a high level. When the elastomer layer has a Shore A hardness of not less than 40, the sheet cannot be adherend in a superior close adhesion state capable of isolating the adherend from humidity and water (including salt water).

While an adherend can be isolated from humidity and water (including salt water) by adhering a pressure-sensitive adhesive layer of a sheet, which affords a high adhesion force, to the adherend, the sheet cannot be easily peeled off from the adherend.

In the sheet of the present invention, the Shore A hardness of the elastomer layer having a Shore A hardness of less than 40 is preferably not more than 39 and, to impart initial adhesiveness (tackiness), it is more preferably not more than 30. While the lower limit of the Shore A hardness is not particularly limited, not less than 0.5 is preferable, and not less than 1 is more preferable.

The sheet of the present invention is a sheet having an elastomer layer having a Shore A hardness of less than 40 and an adhesion force to stainless steel of not more than 11 oz/in at 90 degree peel strength. Since the adhesion force of the elastomer layer to stainless steel is not more than 11 oz/in at 90 degree peel strength, the sheet adhered to an adherend with the surface of the elastomer layer having a Shore A hardness of less than 40 as an adhesive surface to the adherend adheres to the adherend in a good close adhesion state to the adherend and can be easily peeled when detached. When the 90 degree peel strength exceeds 11 oz/in, even when the sheet is adhered to an adherend with the surface of an elastomer layer having a Shore A hardness of less than 40 as an adhesive surface to the adherend, the sheet cannot be easily peeled off from the adherend.

In the sheet of the present invention, the 90 degree peel strength of an elastomer layer having a Shore A hardness of less than 40 to stainless steel is preferably not more than 5 oz/in, more preferably not more than 3 oz/in. The 90 degree peel strength is preferably not less than 1 oz/in. When the 90 degree peel strength is not less than 1 oz/in, sufficient adhesiveness can be secured when the sheet is adhered to an adherend, and it advantageously acts on the maintenance of moisture-proof and anticorrosion of the adherend.

An adhesion target of pressure-sensitive adhesive layer 3 of sheet 10 in the first form, and an adhesion target of one of two elastomer layers 1 having a Shore A hardness of less than 40 of sheet 11 in the second form may be an adherend that does not necessarily require moisture-proof or anticorrosion, or an adherend that does not necessarily require re-peeling of the adhered sheet. However, in sheet 11 in the second form, when two elastomer layers 1 having a Shore A hardness of less than 40 are each adhered to an adherend requiring moisture-proof or anticorrosion, moisture-proof and anticorrosion of two adherends can be achieved by isolating each adherend from humidity and water (including salt water), and the sheet can be easily peeled off from the two adherends.

The sheet 13 in the fourth form (i.e., sheet having laminate constitution of elastomer layer 1 having a Shore A hardness of less than 40/core material 2/elastomer layer 1 having a Shore A hardness of less than 40/substrate 5) has higher strength (tensile strength, tear strength etc.) due to the core material as compared to sheet 14 in the fifth form consisting only of substrate 5 and elastomer layer 1 alone, and advantageously shows smaller water permeability of the sheet. In addition, since a material for elastomer layer formation is coated twice, a sheet having an elastomer layer with a thickness (total thickness) that cannot be provided by single coating can be advantageously obtained.

Examples of the "adherend" in the present invention include various metal members such as aluminum, duralumin, iron, steel (stainless steel, carbon steel (common steel), nickel-chrome steel, nickel-chrome-molybdenum steel, chrome steel, chrome-molybdenum steel, manganese steel etc.) and the like; various plastic members; various glass-fiber-reinforced plastic (GFRP) members such as glass-cloth-reinforced epoxy-impregnated aramid resin and the like; various carbon-fiber-reinforced plastic (CFRP) members such as carbon-fiber-reinforced epoxy-impregnated aramid resin and the like; and the like.

Examples of the adherend to be moisture-proof include various metal members (board, rod, pipe etc.) such as airframe constructional material of aircraft and the like, floor panel (material: aluminum, duralumin, stainless steel, glass-fiber-reinforced plastics (GFRP), carbon-fiber-reinforced plastic (CFRP) etc.) of transporters such as aircraft and the like, structure and the like, and the like.

An adherend that does not necessarily require moisture-proof or anticorrosion, and an adherend that does not necessarily require re-peeling of the adhered sheet, which are the adhesion targets of the pressure-sensitive adhesive layer 3 of sheet 10 in the first form, and one of the two elastomer layers 1 having a Shore A hardness of less than 40 of sheet 11 in the second form, are not particularly limited, and members of various materials in various forms can be mentioned.

In sheet 10 in the first form, for example, moisture-proof of floor panel and airframe constructional material can be achieved, as well as floor panel and airframe constructional material can be temporarily fixed (permanently fixed by fastening screw after temporary fixing) by adhering the surface of elastomer layer 1 having a Shore A hardness of less than 40 to a floor panel and adhering the surface of pressure-sensitive adhesive layer 3 to an airframe constructional material. Particularly, in the case of a sheet wherein a release liner is laminated on an elastomer layer having a Shore A hardness of less than 40, a pressure-sensitive adhesive layer having the release liner is adhered to the floor panel, and the release liner is peeled off, the floor panel is placed on and pressed against an airframe constructional material with the elastomer layer having a Shore A hardness of less than 40 being opposed to the airframe constructional material, whereby the floor panel and airframe constructional material become moisture-proof and the floor panel can be simultaneously laid on the airframe constructional material. Therefore, a floor panel laying work can be performed efficiency. A technique including adhering a pressure-sensitive adhesive layer to an airframe constructional material in advance and mounting a floor panel on an elastomer layer is also possible.

In single-faced adhesive sheets 13, 14 (FIGS. 5(A), 5(B), 6(A) and 6(B)) in the fourth and fifth forms, one of the surface layers is elastomer layer 1 having a Shore A hardness of less than 40, and the other surface layer is substrate 5. Substrate 5 imparts a sheet with self-supporting property, and improves resistance of the sheet to water permeability. Since elastomer layer 1 having a Shore A hardness of less than 40 shows superior adhesion to an adherend, and substrate 5 increases resistance of the sheet to water permeability, when the sheet is adhered to an adherend to be moisture-proof, the adherend can be isolated from humidity and water (including salt water) more effectively. In addition, substrate 5 increases the strength of the sheet (tensile strength, tear strength etc.), and an effect of suppressing tearing during adhesion and peeling of the sheet can be obtained.

Each layer of the sheet of the present invention is explained in detail for each sheet of each embodiment.

(1) Sheet 10 in the First Form (Sheet Having Laminate Constitution of Elastomer Layer 1 Having a Shore a Hardness of Less than 40/Core Film 2/Pressure-Sensitive Adhesive Layer 3)

<Elastomer Layer 1 Having a Shore A Hardness of Less than 40>

The "elastomer layer" in the present invention is a concept including not only a rubber layer formed from a rubber which is a polymer substance having elasticity due to a crosslinked structure, but also a layer formed from an uncrosslinked polymer substance showing the property of rubber elastic body at ambient temperature.

From the aspect of temporal stability of hardness, elastomer layer 1 having a Shore A hardness of less than 40 is preferably a rubber layer having Shore A hardness of less than 40, and from the aspects of durability, flame retardancy, waterproof property and the like of the material, a silicone rubber layer or urethane rubber layer having a Shore A hardness of less than 40 is more preferable, and a silicone rubber layer having a Shore A hardness of less than 40 is particularly preferable.

As the silicone rubber layer having a Shore A hardness of less than 40, a silicone rubber having a Shore A hardness of less than 40 which is obtained by curing a conventionally-known silicone rubber composition can be applied. While the silicone rubber composition may be of any curing type, since forming can be achieved in a short time by heating, one obtained from an addition (hydrosilylation) reaction curing type silicone rubber composition or an organic peroxide curing type silicone rubber composition is preferable. The addition reaction curing type silicone rubber composition may have a known composition, and one containing alkenyl group-containing organopolysiloxane having two or more alkenyl groups represented by a vinyl group in one molecule, organohydrogen polysiloxane having two or more, preferably three or more, SiH groups (generally, in an amount corresponding to molar ratio of SiH group of 0.5-4 to alkenyl group), and platinum or a platinum group metal addition reaction catalyst represented by a platinum compound (generally, 1-1,000 ppm relative to alkenyl group-containing organopolysiloxane) is used. In addition, an organic peroxide curing type silicone rubber composition may be a known composition, and organopolysiloxane having two or more alkenyl groups in one molecule added with a cure effective amount (generally, 1-10 parts by mass per 100 parts by mass of the above-mentioned organopolysiloxane) of organic peroxide as a curing agent is preferably used. A silicone rubber having a Shore A hardness of less than 40 may be a commercially available product and, for example, SILBIONE LSR 6301 (Shore A hardness: 1), LSR 6305 (Shore A hardness: 5) manufactured by Bluestar Silicones, Elastosil 3003/30 (Shore A hardness: 30) manufactured by Wacker Chemie, 3631 (Shore A hardness: 19) manufactured by DOW, and the like can be mentioned.

The urethane rubber layer having a Shore A hardness of less than 40 is a layer formed from a cured product having a Shore A hardness of less than 40 (urethane rubber) obtained by reacting and curing a polyurethane composition. To make the hardness of the urethane rubber show a Shore A hardness of less than 40, the composition of the polyurethane composition only needs to be appropriately selected.

The polyurethane composition is composed of polyisocyanate such as diisocyanate or triisocyanate and the like and polyol such as diol or triol and the like.

The above-mentioned polyisocyanate is not particularly limited, and examples thereof include diisocyanates such as 4,4'-diphenylmethane diisocyanate (MDI), 2,4-tolylene diisocyanate (2,4-TDI), 2,6-tolylene diisocyanate (2,6-TDI), 3,3'-bitolylene-4,4'-diisocyanate, 3,3'-dimethyldiphenylmethane-4,4'-diisocyanate, 2,4-tolylene diisocyanate uretidinedione (2,4-TDI dimer), 1,5-naphthylene diisocyanate, methaphenylene diisocyanate, hexamethylene diisocyanate, isophorone diisocyanate, 4,4'-dicyclohexylmethane diisocyanate (hydrogenated MDI), carbodiimide-modified MDI, orthotoluidine diisocyanate, xylene diisocyanate, paraphenylene diisocyanate, lysine diisocyanate methyl ester and the like, triisocyanates such as triphenylmethane-4,4',4"-triisocyanate and the like, polymeric MDI and the like. These may be used alone or two or more kinds thereof may be used in combination.

The polyol to be used along with the above-mentioned polyisocyanate is not particularly limited, and examples thereof include polyester polyol such as polyester diol, polyester triol and the like, polycaprolactone, polycarbonate, polyetherpolyol such as polyoxytetramethylene glycol, polyoxypropylene glycol and the like, and the like. These may be used alone or two or more kinds thereof may be used in combination.

As the above-mentioned polyester polyol, hydroxylpolyester polyol produced from polybasic organic acid and polyol and having a hydroxyl group as the terminal group is preferably used. Examples of the above-mentioned polybasic organic acid include dicarboxylic acids such as saturated fatty acids such as oxalic acid, succinic acid, glutaric acid, adipic acid, pimelic acid, suberic acid, azelaic acid, sebacic acid, isosebacic acid and the like, unsaturated fatty acids such as maleic acid, fumaric acid and the like, aromatic acids such as phthalic acid, isophthalic acid, terephthalic acid and the like, and the like, acid anhydrides such as maleic anhydride, phthalic anhydride and the like, dialkyl esters such as dimethyl terephthalate and the like, dimer acid obtained by dimerization of unsaturated fatty acid and the like. Examples of the polyol to be used along with the above-mentioned polybasic organic acid include diols such as ethylene glycol, diethylene glycol, triethylene glycol, propylene glycol, dipropylene glycol, butylene glycol, neopentyl glycol, 1,6-hexylene glycol and the like, triols such as trimethylolethane, trimethylolpropane, hexane triol, glycerol and the like, hexaols such as sorbitol and the like, and the like.

As the above-mentioned polyetherpolyol, one produced by ring opening polymerization or copolymerization of cyclic ether is preferably used. Examples of the above-mentioned cyclic ether include ethylene oxide, propylene oxide, trimethylene oxide, butylene oxide, α-methyltrimethylene oxide, 3,3'-dimethyltrimethylene oxide, tetrahydrofuran, dioxane, dioxamin and the like.

The number average molecular weight (Mn) of polyol to be used along with the above-mentioned polyisocyanate is preferably 1500-3000, particularly preferably 1500-2500. That is, when the above-mentioned polyol has an Mn of less than 1500, the property of the obtained urethane rubber layer tends to decrease, and when Mn exceeds 3000, the workability tends to be degraded.

The polyurethane composition may appropriately contain, in addition to polyisocyanate and polyol, chain extender, catalyst, foaming agent, surfactant, flame retardant, colorant, filler, plasticizer, stabilizer, mold release agent and the like.

A urethane rubber layer is formed by reacting and curing a polyurethane composition by cast molding (specifically, prepolymer method, semi-one-shot method, one-shot method) to give a sheet-like cured product.

Elastomer layer 1 having a Shore A hardness of less than 40 can contain a flame retardant. While the flame retardant is not particularly limited, a halogen-free flame retardant which does not produce a toxic halogen gas, is preferable and, for example, known flame retardants free of halogen atom such as hydrated metal compound-based flame retardants, inorganic compound-based flame retardants, phosphorus flame retardant, silicone-based flame retardant, nitrogen compound-based flame retardants, organic metal compound-based flame retardants and the like can be used. Of these, phosphorus flame retardants are preferable since they can impart a flame retardancy effect and are superior in the suppression of drip during combustion, compatibility to environmental regulation and the like. For example, when an elastomer layer is a silicone rubber layer or a urethane rubber layer, the aforementioned silicone rubber composition or polyurethane composition can contain a flame retardant. Depending on the kind of the flame retardant, a flame retardant is preferably contained in about 10-100 parts by weight per 100 parts by weight of the silicone rubber composition or polyurethane composition.

To obtain sheet 10 in the first form having an elastomer layer 1 having a Shore A hardness of less than 40 and an adhesion force to stainless steel of not more than 11 oz/in at 90 degree peel strength, the thickness of the elastomer layer 1 having a Shore A hardness of less than 40 is preferably 2-40 mil, more preferably 15-35 mil. When the thickness of the elastomer layer 1 is within such preferable range, the maintenance of a wrapped state of a roll product and handling property as a tape become more superior.

<Core Material 2>

The material of core material 2 is not particularly limited. Examples thereof include a single layer or laminate plastic film made from one or more kinds selected from polyester (e.g., poly(ethylene terephthalate) (PET) and the like); nylon; polyvinyl chloride; polyvinylidene chloride; polyolefin (e.g., polyethylene, polypropylene, reactor TPO, ethylene-vinyl acetate copolymer and the like); fluororesin (e.g., polytetrafluoroethylene (PTFE), polychlorotrifluoroethylene (PCTFE), polyvinylidene fluoride (PVDF), polyvinyl fluoride (PVF), perfluoroalkoxy fluororesin (PFA), tetrafluoroethylene hexafluoropropylene copolymer (FEP), ethylene tetrafluoroethylene copolymer (ETFE), ethylene chlorotrifluoroethylene copolymer (ECTFE) and the like) and the like, a metal foil, and the like. Also, it may be a film obtained by laminating a plastic film and a metal foil. These films may be used in a solid film (nonporous film) state, or a perforated film after a mechanical perforation treatment. A fiber sheet (a single layer sheet, laminated sheet of two or more layers) such as knitted fabric, woven fabric, non-woven fabric and the like using one or more kinds of fibers selected from synthetic polymer fibers such as polyester (e.g., poly(ethylene terephthalate) (PET) and the like) and the like, natural fibers such as cotton, hemp and the like, metal fiber and glass fiber, and a laminated sheet wherein one or more kinds of such fiber sheets are laminated on the aforementioned plastic film can also be used as a substrate sheet 1. In addition, glass cloth, Japanese paper, non-fiber paper and the like can also be used as a core material 2. Of these, from the aspects of the resistance of the sheet to water permeability (moisture-barrier property), one having less air holes through which the moisture passes is preferable, and a nonporous film is preferable. The "nonporous film" means a solid film excluding mesh cloth, woven fabric, non-woven fabric, mesh film (sheet), perforated film (sheet) and the like.

From the aspects of moisture-proof property, flame retardancy, flexibility and the like, preferred is a fluororesin film (solid), and more preferred is a PTFE film (solid).

For penetrate bolting after sheet configuration and the like, from the aspects of workability of bolting, imparting strength on peeling and the like, a glass fiber sheet (particularly glass cloth) is preferable.

The fabric weight of glass fiber sheet is preferably 5-1000 g/m$^2$ from the aspects of the strength and transparency of the sheet, and the thickness (diameter) of the glass fiber is preferably abut 0.4-39 mil. In the case of a glass cloth, the form thereof may be, for example, plain weave, satin weave, twill weave, mat weave and the like. The adhesiveness of the glass cloth to an elastomer layer can be improved by a surface treatment with a silane coupling agent.

While the thickness of the core material 2 is not particularly limited, to obtain sheet 10 in the first form having an elastomer layer 1 having a Shore A hardness of less than 40 and an adhesion force to stainless steel of not more than 11 oz/in at 90 degree peel strength, 0.5-10 mil is preferable, 2-7 mil is more preferable. While the thickness of the core material 2 is within such preferable range, the maintenance of a wrapped state of a roll product and handling efficiency as a tape are further improved.

<Pressure-Sensitive Adhesive Layer 3>

The pressure-sensitive adhesive to be used for the pressure-sensitive adhesive layer 3 is not particularly limited, and acrylic, silicone-based, natural rubber-based, synthetic rubber-based, polyoxyalkylene-based adhesives and the like can be mentioned. Of these, a polyoxyalkylene-based adhesive is preferable. The polyoxyalkylene-based adhesive is superior in high adhesion force, moisture-proof property, and concave convex adaptability.

(Acrylic Adhesive)

Specifically, as the acrylic adhesive, an acrylic adhesive containing, as a base polymer, an acrylic polymer with a monomer unit of alkyl(meth)acrylate as a main backbone is preferable (here, the "(meth)acrylate" means "acrylate and/or methacrylate").

The average carbon number of the alkyl group of the alkyl(meth)acrylate constituting the main backbone of the acrylic polymer is preferably about 1 to 18. Specific examples of such alkyl(meth)acrylate include methyl(meth)acrylate, ethyl(meth)acrylate, n-butyl(meth)acrylate, 2-ethylhexyl(meth)acrylate, isooctyl(meth)acrylate, isononyl (meth)acrylate, lauryl (meth)acrylate and the like. One or more kinds of these are used in combination. Among these, alkyl(meth)acrylate wherein the carbon number of the alkyl group is 1 to 12 is preferable.

One or more kinds of various monomers may be introduced into an acrylic polymer by copolymerization to improve adhesiveness to a sealed object and heat resistance of the pressure-sensitive adhesive sheet containing a non-halogenated flame retardant. Specific examples of such copolymerizable monomer include monomers containing a hydroxyl group such as 2-hydroxyethyl (meth)acrylate, 2-hydroxypropyl (meth)acrylate, 4-hydroxybutyl (meth) acrylate, 6-hydroxyhexyl (meth)acrylate, 8-hydroxyoctyl (meth)acrylate, 10-hydroxydecyl (meth)acrylate, 12-hydroxylauryl (meth)acrylate, (4-hydroxymethylcyclohexyl) methyl (meth)acrylate and the like; monomers containing a carboxyl group such as (meth)acrylic acid, carboxyethyl (meth)acrylate, carboxypentyl(meth)acrylate, itaconic acid, maleic acid, fumaric acid, crotonic acid and the like; monomers containing an acid anhydride group such as maleic anhydride, itaconic anhydride and the like; caprolactone adduct of acrylic acid; monomers containing a sulfonic acid group such as styrenesulfonic acid, allylsulfonic acid, 2-(meth)acrylamide-2-methylpropanesulfonic acid, (meth) acrylamidepropanesulfonic acid, sulfopropyl (meth)acrylate, (meth)acryloyloxynaphthalenesulfonic acid and the like; monomers containing a phosphate group such as 2-(phosphonooxy)ethyl acrylate etc., and the like. In addition, nitrogen containing vinyl monomers can be mentioned, for example, maleimide, N-cyclohexylmaleimide, N-phenylmaleimide; N-acryloylmorpholine; (N-substituted) amide monomers such as (meth)acrylamide, N,N-dimethyl (meth)acrylamide, N,N-diethyl(meth)acrylamide, N-hexyl (meth)acrylamide, N-methyl(meth)acrylamide, N-butyl (meth)acrylamide, N-butyl(meth)acrylamide, N-methylol (meth)acrylamide, N-methylolpropane(meth)acrylamide and the like; alkylaminoalkyl (meth)acrylate monomers such as aminoethyl (meth)acrylate, aminopropyl (meth) acrylate, N,N-dimethylaminoethyl (meth)acrylate, t-butylaminoethyl (meth)acrylate, 3-(3-pyridinyl)propyl(meth) acrylate and the like; alkoxyalkyl (meth)acrylate monomers such as methoxyethyl (meth)acrylate, ethoxyethyl (meth) acrylate and the like; succinimide monomers such as N-(meth)acryloyloxymethylenesuccinimide, N-(meth)acryloyl-6-oxyhexamethylenesuccinimide, N-(meth)acryloyl-8-oxyoctamethylenesuccinimide, N-acryloylmorpholine etc., and the like can be mentioned.

Furthermore, vinyl monomers such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic acid amides, styrene, α-methylstyrene, N-vinylcaprolactam and the like; cyanoacrylate monomers such as acrylonitrile, methacrylonitrile and the like; epoxy group-containing acrylic monomers such as glycidyl (meth)acrylate and the like; glycol acrylate monomers such as polyethylene glycol (meth)acrylate, polypropylene glycol (meth)acrylate, methoxyethylene glycol (meth)acrylate, methoxypolypropylene glycol (meth) acrylate and the like; acrylate monomers such as tetrahydrofurfuryl (meth)acrylate, fluorine-containing (meth)acrylate, silicone (meth)acrylate, 2-methoxyethyl acrylate etc., and the like can also be mentioned.

Among these, when an isocyanate-based crosslinking agent is used as a crosslinking agent, a hydroxyl group-containing monomer is preferable since the reactivity with the isocyanate group is good. Carboxyl group-containing monomers such as (meth)acrylic acid and the like are preferable in view of the adhesiveness to a sealed object, adhesion durability, weatherability and the like of the flame retardant-containing pressure-sensitive adhesive sheet, and acrylic acid is particularly preferable.

The weight ratio of the copolymerizable monomer in the acrylic polymer is preferably about 0.1-10 wt %.

While the average molecular weight of the acrylic polymer is not particularly limited, the weight average molecular weight is generally about 300,000 to 2,500,000.

Acrylic polymers are produced by various known methods and, for example, radical polymerization methods such as bulk polymerization method, solution polymerization method, suspension polymerization method and the like can be appropriately employed. As a radical polymerization initiator, various known azo-based initiators and peroxide-based initiators can be used. The reaction temperature is generally about 50 to 80° C., and the reaction time is 1 to 8 hr.

The acrylic adhesive can contain a crosslinking agent in addition to a base polymer, and the crosslinking agent can improve adhesion to an optical board and durability, and can provide reliability at a high temperature and maintain the form of the adhesive itself. As the crosslinking agent, a known crosslinking agent such as isocyanate-based crosslinking agents, epoxy-based crosslinking agents, peroxide-based crosslinking agents, metal chelate-based crosslinking agents, oxazoline-based crosslinking agents and the like can be appropriately used. One or more kinds of these crosslinking agents can be used in combination. The amount of the crosslinking agent to be used is not more than 10 parts by weight, preferably 0.01-5 parts by weight, more preferably 0.02-3 parts by weight, relative to 100 parts by weight of the acrylic polymer. A ratio of the crosslinking agent exceeding 10 parts by weight is not preferable, since crosslinking may proceed too much to decrease adhesiveness.

(Silicone-Based Adhesive)

The silicone-based adhesive is not particularly limited, and peroxide crosslinking type silicone-based adhesives (peroxide curing type silicone-based adhesive) and addition reaction type silicone-based adhesives, which are generally used, can be preferably used. These peroxide crosslinking type silicone-based adhesives and addition reaction type silicone-based adhesives may be commercially available products. Specific examples of the peroxide crosslinking type silicone-based adhesive include KR-3006A/BT manufactured by Shin-Etsu Chemical Co., Ltd., SH 4280 PSA manufactured by Toray Dow Corning Corporation Silicone and the like. Specific examples of the addition reaction type silicone-based adhesive include X-40-3501 manufactured by Shin-Etsu Chemical Co., Ltd., BY 24-712 manufactured by Toray Dow Corning Corporation Silicone, TSE32X manufactured by GE Toshiba Silicones Co., Ltd. and the like.

(Polyoxyalkylene-Based Adhesive)

As the polyoxyalkylene-based adhesive, a cured product of a composition containing the following components A-C is preferable:
A: a polyoxyalkylene polymer having at least one alkenyl group in one molecule
B: a compound containing two or more hydrosilyl groups on average in one molecule
C: a hydrosilylation catalyst.

The above-mentioned "polyoxyalkylene polymer having at least one alkenyl group in one molecule" of component A is not particularly limited, and various polymers can be used. However, one wherein the main chain of the polymer has a repeat unit represented by the formula (1) shown below is preferable:

$R^1$—O—   formula (1)

wherein $R^1$ is an alkylene group.
$R^1$ is preferably a linear or branched alkylene group having 1 to 14, more preferably 2 to 4, carbon atoms.

As specific examples of the repeat unit represented by the general formula (1), —CH$_2$O—, —CH$_2$CH$_2$O—, —CH$_2$CH(CH$_3$)O—, —CH$_2$CH(C$_2$H$_5$)O—, —CH$_2$C(CH$_3$)$_2$O—, —CH$_2$CH$_2$CH$_2$CH$_2$O— and the like can be included. The main chain skeleton of the polyoxyalkylene polymer may consist of only one kind of repeat unit, and may consist of two kinds or more of repeat units. Particularly, from the aspects of availability and workability, a polymer having —CH$_2$CH(CH$_3$)O— as a main repeat unit is preferable. In the main chain of the polymer, a repeat unit other than the oxyalkylene group may be contained. In this case, the total sum of oxyalkylene units in the polymer is preferably not less than 80% by weight, particularly preferably not less than 90% by weight.

Although the polymer of component A may be a linear polymer or a branched polymer, or a mixture thereof, it preferably contains a linear polymer in a proportion of not less than 50% by weight, so that the adhesive layer will show good adhesiveness to the surface of various materials.

The molecular weight of the polymer of component A is preferably 500 to 50,000, more preferably 5,000 to 30,000, in terms of number-average molecular weight. When the number average molecular weight is less than 500, the obtained cured product tends to be too brittle, and when the number average molecular weight exceeds 50,000, the viscosity becomes unfavorably too high to markedly decrease workability. The number average molecular weight here means the value obtained by a gel permeation chromatography (GPC) method.

The polymer of component A preferably has a narrow molecular weight distribution wherein the ratio of weight-average molecular weight and number-average molecular weight (Mw/Mn) is not more than 1.6; a polymer having an Mw/Mn of not more than 1.6 produces a decreased viscosity of the composition and offers improved workability. Hence, the Mw/Mn is more preferably not more than 1.5, still more preferably not more than 1.4. As mentioned herein, Mw/Mn refers to a value obtained by a gel permeation chromatography (GPC) method.

Here, the molecular weight (based on polystyrene) is measured by the GPC method using GPC apparatus (HLC-8120GPC) manufactured by Tosoh Corporation, where the measurement conditions are as follows.

sample concentration: 0.2 wt % (THF solution)
sample injection volume: 10 μl
eluent: THF
flow rate: 0.6 ml/min
measurement temperature: 40° C.
column: sample column TSKgel GMH—H(S)
detector: differential refractometer With regard to the polymer of component A (polyoxyalkylene polymer having at least one alkenyl group in one molecule), the alkenyl group is not subject to limitation, but an alkenyl group represented by the formula (2) shown below is suitable:

H$_2$C=C(R$^2$)—   formula (2)

wherein $R^2$ is hydrogen or a methyl group.

The mode of binding of the alkenyl group to the polyoxyalkylene polymer is not subject to limitation; for example, alkenyl group direct bond, ether bond, ester bond, carbonate bond, urethane bond, urea bond and the like can be included.

As specific examples of the polymer of component A, a polymer represented by the formula (3): {H$_2$C=C(R$^{3a}$)—R$^{4a}$—O}$a_1$R$^{5a}$ wherein R$^{3a}$ is hydrogen or a methyl group; R$^{4a}$ is a divalent hydrocarbon group having 1 to 20 carbon atoms, optionally having one or more ether groups, R$^{5a}$ is a polyoxyalkylene polymer residue; $a_1$ is a positive integer, can be included. As R$^{4a}$ in the formula, specifically, —CH$_2$—, —CH$_2$CH$_2$—, —CH$_2$CH$_2$CH$_2$—, —CH$_2$CH(CH$_3$)CH$_2$—, —CH$_2$CH$_2$CH$_2$CH$_2$—, —CH$_2$CH$_2$OCH$_2$CH$_2$—, or —CH$_2$CH$_2$OCH$_2$CH$_2$CH$_2$— and the like can be included; for the ease of synthesis, —CH$_2$— is preferable.

A polymer having an ester bond, represented by the formula (4): {H$_2$C=C(R$^{3b}$)—R$^{4b}$—OCO}$a_2$R$^{5b}$ wherein R$^{3b}$, R$^{4b}$, R$^{5b}$ and $a_2$ have the same definitions as those of R$^{3a}$, R$^{4a}$, R$^{5a}$ and $a_1$, respectively, can also be included.

A polymer represented by the formula (5): $\{H_2C=C(R^{3c})\}a_3R^{5c}$ wherein $R^{3c}$, $R^{5c}$ and $a_3$ have the same definitions as those of $R^{3a}$, $R^{5a}$, and $a_1$, respectively, can also be included.

Furthermore, a polymer having a carbonate bond, represented by the formula (6): $\{H_2C=C(R^{3d})-R^{4d}-O(CO)O\}a_4R^{5d}$ wherein $R^{3d}$, $R^{4d}$, $R^{5d}$ and $a_4$ have the same definitions as those of $R^{3a}$, $R^{4a}$, $R^{5a}$ and $a_1$, respectively, can also be included.

It is preferable that at least 1, preferably 1 to 5, more preferably 1.5 to 3, alkenyl groups be present in one molecule of the polymer of component A. If the number of alkenyl groups contained in one molecule of the polymer of component A is less than 1, the curing is insufficient; if the number exceeds 5, the mesh structure becomes so dense that the polymer sometimes fails to exhibit a good adherence. The polymer of component A can be synthesized according to the method described in JP-A-2003-292926, and any commercially available product can be used.

Particularly preferable embodiment of the polymer of component A includes terminus-allylated polyoxypropylene wherein an allyl group is bonded to both terminals of polypropylene glycol.

Any component B "compound containing two or more hydrosilyl groups on average in one molecule" can be used without limitation, as long as it has a hydrosilyl group (a group having an Si—H bond), but from the viewpoint of the ease of obtainment of raw materials and compatibility with the component A, an organohydrogen polysiloxane modified with an organic constituent is particularly preferable. The aforementioned polyorganohydrogen siloxane modified with an organic constituent more preferably has an average of 2 to 8 hydrosilyl groups in one molecule. Specific examples of the structure of the polyorganohydrogen siloxane include linear or cyclic ones represented by, for example,

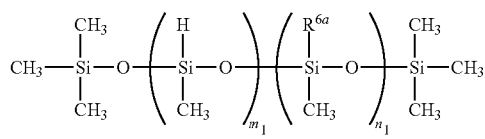

wherein $2 \leq m_1 + n_1 \leq 50$, $2 \leq m_1$, and $0 \leq n_1$, $R^{6a}$ is a hydrocarbon group having 2 to 20 carbon atoms in the main chain thereof, optionally comprising one or more phenyl groups,

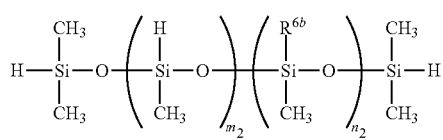

wherein $0 \leq m_2 + n_2 \leq 50$, $0 \leq m_2$, and $0 \leq n_2$, $R^{6b}$ is a hydrocarbon group having 2 to 20 carbon atoms in the main chain thereof, optionally comprising one or more phenyl groups, or

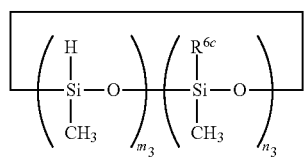

wherein $3 \leq m_3 + n_3 20$, $2 \leq m_3 \leq 19$, and $0 \leq n_3 < 18$, $R^{6c}$ is a hydrocarbon group having 2 to 20 carbon atoms in the main chain thereof, optionally having one or more phenyl groups, and the like, and ones having two or more of these units, represented by the following:

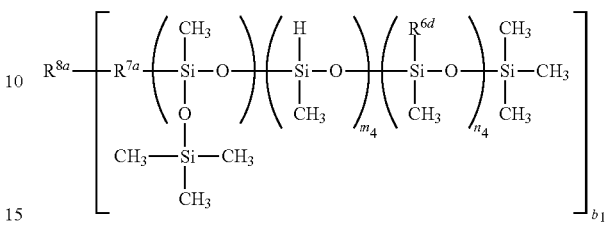

wherein $1 \leq m_4 + n_4 \leq 50$, $1 \leq m_4$, and $0 \leq n_4$, $R^{6d}$ is a hydrocarbon group having 2 to 20 carbon atoms in the main chain thereof, optionally having one or more phenyl groups, $2 \leq b_1$, $R^{8a}$ is a divalent to tetravalent organic group, and $R^{7a}$ is a divalent organic group, but $R^{7a}$ may be absent depending on the structure of $R^{8a}$,

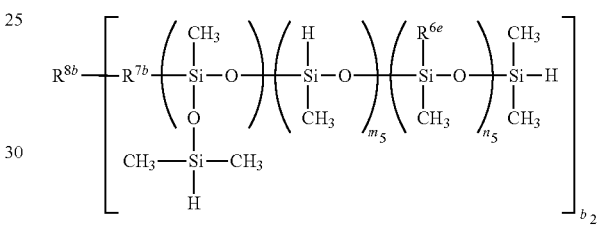

wherein $0 \leq m_5 + n_5 \leq 50$, $0 \leq m_5$, and $0 \leq n_5$, $R_{6e}$ is a hydrocarbon group having 2 to 20 carbon atoms in the main chain thereof, optionally having one or more phenyl groups, $2 \leq b_2$, $R^{8b}$ is a divalent to tetravalent organic group, and $R^{7b}$ is a divalent organic group, however, $R^{7b}$ may be absent depending on the structure of $R^{8b}$, or

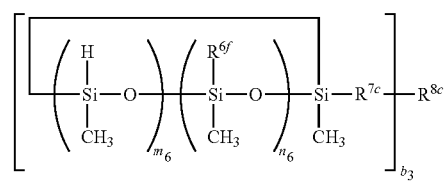

wherein $3 \leq m_6 + n_6 \leq 50$, and $0 \leq n_6$, $R^{6f}$ is a hydrocarbon group having 2 to 20 carbon atoms in the main chain thereof, optionally comprising one or more phenyl groups, $2 \leq b_3$, $R^{8c}$ is a divalent to tetravalent organic group, and $R^{7c}$ is a divalent organic group, however, $R^{7c}$ may be absent depending on the structure of $R^{8c}$, and the like.

The "compound containing two or more hydrosilyl groups on average in one molecule" for component B preferably has good compatibility with the component A and the component C, or good dispersion stability in the system. Particularly, if the viscosity of the entire system is low, use of an ingredient whose compatibility with any of the above-described ingredients is low as the component B sometimes causes phase separation and a curing failure.

As a specific example of the component B having relatively good compatibility with the component A and the component C, or relatively good dispersion stability, the following can be included.

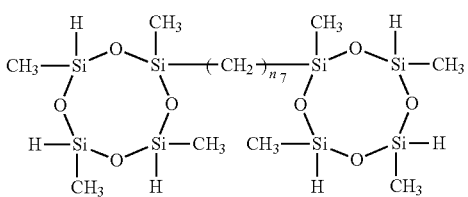

wherein $n_7$ is an integer of not less than 4 and not more than 10,

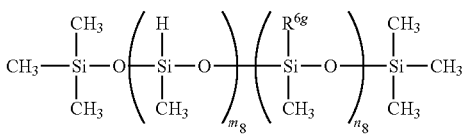

wherein $2 \leq m_8 \leq 10$ and $0 \leq n_8 \leq 5$, $R^{6g}$ is a hydrocarbon group having eight or more carbon atoms.

As specific preferable examples of the component B, polymethylhydrogen siloxane can be included; for assuring compatibility with the component A and adjusting the SiH content, a compound modified with α-olefin, styrene, α-methylstyrene, allylalkyl ether, allylalkyl ester, allylphenyl ether, allylphenyl ester or the like can be included; as an example, the following structure can be included.

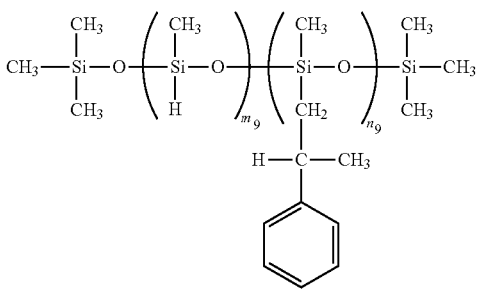

wherein $2 \leq m_9 \leq 20$ and $1 \leq n_9 \leq 20$.

The component B can be synthesized by a commonly known method, and any commercially available product can be used.

In the present invention, any component C "hydrosilylation catalyst" is not subject to limitation; an optionally chosen one can be used. As specific examples, chloroplatinic acid; elemental platinum; solid platinum supported by a carrier such as alumina, silica, or carbon black; a platinum-vinylsiloxane complex {for example, $Pt_n(ViMe_2SiOSiMe_2Vi)_m$, $Pt[(MeViSiO)_4]_m$ and the like}; a platinum-phosphine complex {for example, $Pt(PPh_3)_4$, $Pt(PBu_3)_4$ and the like}; a platinum-phosphite complex {for example, $Pt[P(OPh)_3]_4$, $Pt[P(OBu)_3]_4$ and the like}; $Pt(acac)_2$; the platinum-hydrocarbon composite described in U.S. Pat. Nos. 3,159,601 and 3,159,662 of Ashby et al.; the platinum alcoholate catalyst described in U.S. Pat. No. 3,220,972 of Lamoreaux et al. and the like can be included. (In these formulas, Me represents a methyl group, Bu represents a butyl group, Vi represents a vinyl group, Ph represents a phenyl group, acac represents an acetylacetonato, and each of n and m represents an integer.)

As examples of catalysts other than platinum compounds, $RhCl(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$, $TiCl_4$ and the like can be included.

These catalysts may be used alone, and may be used in combination of two kinds or more. With regard to catalyst activity, chloroplatinic acid, a platinum-phosphine complex, a platinum-vinylsiloxane complex, $Pt(acac)_2$ and the like are preferable.

Although the amount of the component C formulated is not subject to limitation, from the viewpoint of assurance of composition potlife and transparency of the cured product (adhesive layer), the amount is generally not more than $1 \times 10^{-1}$ mol, preferably not more than $5.3 \times 10^{-2}$ mol, relative to 1 mol of alkenyl groups in the component A; particularly, from the viewpoint of transparency of the cured product (adhesive layer), the amount is more preferably not more than $3.5 \times 10^{-2}$ mol, particularly preferably not more than $1.4 \times 10^{-3}$ mol. When the amount exceeds $1 \times 10^{-1}$ mol relative to 1 mol of alkenyl groups in the component A, the finally obtained cured product (adhesive layer) is likely to undergo yellowing and the transparency of the cured product (adhesive layer) tends to be damaged. When the amount of the component C formulated is too low, the composition curing speed is slow, and the curability tends to be unstable; therefore, the amount is preferably not less than $8.9 \times 10^{-5}$ mol, more preferably not less than $1.8 \times 10^{-4}$ mol.

The composition comprising the above-described components A to C is cured by heating. That is, the alkenyl group of component A (polyoxyalkylene polymer having at least one alkenyl group in one molecule) is hydrosilylated by the hydrosilyl group (group having Si—H bond) of component B (compound containing two or more hydrosilyl groups on average in one molecule) in the presence of a hydrosilylation catalyst (component C) to allow crosslinking to proceed, whereby curing is completed. The cured product has low activity, and does not react upon contact with various substances such as water, metal, plastic material and the like.

In a composition comprising components A to C, it is preferable that component A and component B be contained so that the functional group ratio of the hydrosilyl groups of component B (compound B) to the alkenyl groups of component A (compound A) will be not less than 0.3 and less than 2, more preferably not less than 0.4 and less than 1.8, and still more preferably not less than 0.5 and less than 1.5. When the foregoing functional group ratio will exceed 2, the crosslinking density increases, and it is sometimes impossible to obtain adhesiveness. When the functional group ratio is less than 0.3, crosslinking in the cured product becomes too weak, and retention of characteristics at high temperatures may become difficult.

The pressure-sensitive adhesive layer 3 can contain a flame retardant. While the flame retardant is not particularly limited, a halogen-free flame retardant which does not produce a toxic halogen gas, is preferable and, for example, known flame retardants free of halogen atom such as hydrated metal compound-based flame retardants, inorganic compound-based flame retardants, phosphorus flame retardant, silicone-based flame retardant, nitrogen compound-based flame retardants, organic metal compound-based flame retardants and the like can be used. Of these, phosphorus flame retardants are preferable since they can impart a flame retardancy effect and are superior in the suppression of drip during combustion, compatibility to environmental regulation and the like. While the amount thereof to be used varies depending on the kind of the flame retardant, it is preferably about 10-100 parts by weight per 100 parts by weight of the adhesive.

The pressure-sensitive adhesive layer 3 can contain a tackifier resin. Examples of the tackifier resin include terpene tackifier resin, phenol-based tackifier resin, rosin-based tackifier resin, petroleum-based tackifier resin and the like. One or more kinds of tackifier resin can be used.

Examples of the terpene-based tackifier resin include terpene-based resins such as α-pinene polymer, β-pinene polymer, dipentene polymer and the like, modified terpene-based resins (e.g., terpenephenol-based resin, styrene-modified terpene-based resin, aromatic-modified terpene-based resin, hydrogenated terpene-based resin etc.) obtained by modifying (phenol-modification, aromatic-modification, hydrogenated-modification, hydrocarbon-modification etc.) these terpene-based resins, and the like.

Examples of the phenol-based tackifier resin include condensates (e.g., alkylphenolic resin, xyleneformaldehyde-based resin and the like) of various phenols (e.g., phenol, m-cresol, 3,5-xylenol, p-alkylphenol, resorcin etc.) and formaldehyde, resol obtained by addition reaction of the aforementioned phenols with formaldehyde using an alkali catalyst, novolac obtained by condensation reaction of the aforementioned phenols with formaldehyde using an acid catalyst and the like.

Examples of the rosin-based tackifier resin include unmodified rosin (natural rosin) such as gum rosin, wood rosin, tall oil rosin and the like, modified rosin (hydrogenated rosin, disproportionated rosin and polymerized rosin, and other chemically-modified rosin etc.) obtained by modifying the above unmodified rosins by hydrogenation, disproportionation polymerization and the like, various rosin derivatives and the like. Examples of the aforementioned rosin derivative include rosin esters such as esterified compound of rosin obtained by esterifying unmodified rosin with an alcohol and esterified compound of modified rosin obtained by esterifying modified rosin, hydrogenated rosin, disproportionated rosin, polymerized rosin and the like) with an alcohol and the like; unsaturated fatty acid-modified rosins obtained by modifying unmodified rosin or modified rosin (hydrogenated rosin, disproportionated rosin, polymerized rosin etc.) with unsaturated fatty acid; unsaturated fatty acid-modified rosin ester obtained by modifying rosin ester with an unsaturated fatty acid; rosin alcohols obtained by reduction-treating a carboxyl group in unmodified rosin, modified rosin (hydrogenated rosin, disproportionated rosin, polymerized rosin etc.), unsaturated fatty acid-modified rosins or unsaturated fatty acid-modified rosin esters; metal salts of rosins such as unmodified rosin, modified rosin, various rosin derivatives and the like (particularly, rosin esters); and the like. In addition, as the rosin derivative, a rosin phenol resin obtained by adding phenol to rosins (unmodified rosin, modified rosin, various rosin derivatives etc.) with an acid catalyst and subjecting same to thermal polymerization and the like can also be used.

Examples of the alcohol to be used for obtaining the above-mentioned rosin esters include divalent alcohols such as ethylene glycol, diethylene glycol, propylene glycol, neopentyl glycol and the like, trivalent alcohols such as glycerol, trimethylolethane, trimethylolpropane and the like, tetravalent alcohols such as pentaerythritol, diglycerol and the like, hexahydric alcohols such as dipentaerythritol etc. and the like. These are used alone or in a combination of two or more kinds thereof.

Examples of the petroleum-based tackifier resin include known petroleum resins such as aromatic petroleum resin, aliphatic petroleum resin, alicyclic petroleum resin (aliphatic cyclic petroleum resin), aliphatic aromatic petroleum resin, aliphatic alicyclic petroleum resin, hydrogenated petroleum resin, coumarone resin, coumarone indene resin and the like. Specific examples of the aromatic petroleum resin include polymers using one or more kinds of vinyl group-containing aromatic hydrocarbon having 8 to 10 carbon atoms (styrene, o-vinyltoluene, m-vinyltoluene, p-vinyltoluene, α-methylstyrene, β-methylstyrene, indene, methylidene etc.) and the like. As the aromatic petroleum resin, an aromatic petroleum resin obtained from a fraction such as vinyltoluene, indene and the like (i.e., "C9 petroleum fraction") (namely, "C9 petroleum resin") can be used preferably. Examples of the aliphatic petroleum resin include polymers obtained by using one or more kinds selected from dienes such as olefin having 4 or 5 carbon atoms (e.g., butene-1, isobutylene, pentene-1 etc.), butadiene, piperylene, 1,3-pentadiene, isoprene etc., and the like. Furthermore, as the aliphatic petroleum resin, an aliphatic petroleum resin obtained from a fraction such as butadiene, piperylene, isoprene and the like (i.e., "C4 petroleum fraction", "C5 petroleum fraction" etc.) (namely, "C4 petroleum resin", "C5 petroleum resin" etc.) can be used preferably. Examples of the alicyclic petroleum resin include an alicyclic hydrocarbon resin obtained by cyclization and dimerization of an aliphatic petroleum resin (i.e., "C4 petroleum resin", "C5 petroleum resin" etc.), followed by polymerization, a polymer of a cyclic diene compound (cyclopentadiene, dicyclopentadiene, ethylidenenorbornane, dipentene, ethylidenebicycloheptene, vinylcycloheptene, tetrahydroindene, vinylcyclohexene, limonene etc.) or a hydrogenated resin thereof, an alicyclic hydrocarbon resin obtained by hydrogenating the aromatic ring of the aforementioned aromatic hydrocarbon resin, the following aliphatic aromatic petroleum resin and the like. Examples of the aliphatic aromatic petroleum resin include a styrene-olefin copolymer and the like. In addition, as the aliphatic aromatic petroleum resin, a so-called "C5/C9 copolymerization petroleum resin" and the like can be used.

The tackifier resin is preferably terpene-based tackifier resin and/or rosin-based tackifier resin, particularly preferably rosin-based tackifier resin, from the aspect of flame retardancy of a sheet. The terpene tackifier resin and rosin-based tackifier resin easily provide effect as flame retardant auxiliary agents. Using these, adhesion of a sheet to an adherend and the flame retardancy of a sheet can be improved. The terpene-based tackifier resin is particularly preferably a terpenephenol resin, the rosin-based tackifier resin is particularly preferably rosin ester (i.e., esterified compound of unmodified rosin, hydrogenated rosin, disproportionated rosin or polymerized rosin), and the rosin ester is preferably trivalent or higher polyhydric alcohol ester, particularly preferably tetra to hexahydric polyhydric alcohol ester.

One or more kinds of the tackifier resins can be used in combination, and the amount thereof to be used is not particularly limited. However, it is preferably not less than 5 parts by weight, more preferably not less than 10 parts by weight, particularly preferably not less than 15 parts by weight, relative to 100 parts by weight of the adhesive, since it becomes a carbon source and sufficiently exhibits the effect of a phosphorus flame retardant as an auxiliary agent. From the aspects of maintenance of adhesive property, preservability, handling property, dispersibility and the like, it is preferably not more than 100 parts by weight, more preferably not more than 60 parts by weight, particularly preferably not more than 40 parts by weight.

The pressure-sensitive adhesive layer 3 can contain, where necessary, various additives such as plasticizer, filler made of glass fiber, glass bead, metal powder, pigment, colorant, antioxidant, UV absorber and the like.

To obtain sheet 10 in the first form having an elastomer layer 1 having a Shore A hardness of less than 40 and an adhesion force to stainless steel of not more than 11 oz/in at 90 degree peel strength, the thickness of the pressure-sensitive adhesive layer 3 is preferably 1-40 mil, more preferably 15-25 mil. When the thickness of the pressure-sensitive adhesive layer 3 is within such preferable range, the maintenance of a wrapped state of roll products 51, 52 made of sheet 10 and handling efficiency and the like as a sheet are further improved.

In the sheet 10 in the first form, the thickness of the whole sheet, that is, the total thickness of elastomer layer 1 having a Shore A hardness of less than 40, core material 2 and pressure-sensitive adhesive layer 3 is preferably 3-90 mil, more preferably 30-70 mil. When the total thickness is within such preferable range, the maintenance of a wrapped state of roll products 51, 52 made of sheet 10 and handling efficiency and the like as a sheet are further improved.

<Release Liner 4>

As release liner 4, (a) a release-treated layer with a release agent is formed at least one face of a substrate for a release liner, (b) low adhesive substrate composed of a fluorinated polymer (e.g., polytetrafluoroethylene (PTFE), polychlorotrifluoroethylene, polyvinyl fluoride, polyvinyl idene fluoride, tetrafluoroethylene•hexafluoropropylene copolymer, chlorofluoroethylene•vinylidene fluoride copolymer etc.), (c) a low adhesive substrate composed of a non-polar polymer (e.g., olefin-based resin such as polyethylene, polypropylene and the like, and the like), (d) conventionally used peel paper (crepe paper, embossed paper, Japanese paper, fiber paper etc.) and the like can be used.

Examples of the substrate for a release liner include plastic substrates such as polyester film (poly(ethylene terephthalate) film etc.), olefin-based resin film (polyethylene (PE) film, polypropylene (PP) film etc.), polyvinyl chloride film, polyimide film, polyamide film (nylon film), rayon film and the like, paper (quality paper, Japanese paper, craft paper, glassine, synthetic paper, top-coat paper and the like), multi-layered product (composite of 2-3 layers) of these by lamination, coextrusion and the like and the like.

When the release liner is laminated on elastomer layer 1, as a release agent that forms a release-treated layer, a silicone-based release agent, a fluorinated release agent, a long chain alkyl-based release agent and the like are used.

When the release liner is laminated on pressure-sensitive adhesive layer 3 (particularly polyoxyalkylene-based adhesive layer), a release agent that forms a release-treated layer is preferably a fluorosilicone-based release agent, particularly preferably a fluorosilicone-based release agent cation-polymerized by UV radiation.

A release-treated layer is formed by applying a coating solution obtained by dissolving or dispersing a release agent in an organic solvent to at least one face of a substrate for a release liner with a general coating apparatus such as roll coater, reverse coater, doctor blade coater and the like, and drying same. While the coating amount (solid content) of the release agent is not particularly limited, it is generally about 0.05-6 mg/cm$^2$.

The thickness (thickness of substrate for release liner, thickness of low adhesive substrate) of the release liner is preferably about 0.5-5 mil, more preferably about 2-3 mil. When the thickness is in such preferable range, the flexibility, handling workability and the like of the release liner are further improved. As the release liner, one using PE film, PP film and the like as a substrate for a release liner, or a low adhesive substrate composed of PE, PP or PTFE is preferable from the aspect of flexibility.

(2) Sheet 11 in the second form (sheet having laminate constitution of elastomer layer 1 having a Shore A hardness of less than 40/core film 2/elastomer layer 1 having a Shore A hardness of less than 40)

<Elastomer Layer 1 Having a Shore A Hardness of Less than 40>

The detail and preferable embodiment and the like of the constitution materials of elastomer layer 1 follow those of elastomer layer 1 of the above-mentioned sheet 10 in the first form.

To obtain sheet 11 having an elastomer layer 1 having a Shore A hardness of less than 40 and an adhesion force to stainless steel of not more than 11 oz/in at 90 degree peel strength, the thickness of the elastomer layer 1 having a Shore A hardness of less than 40 is preferably 2-40 mil, more preferably 15-35 mil. When the thickness of the elastomer layer 1 is within such preferable range, the maintenance of a wrapped state of a roll product 53 and handling property as a sheet become more superior.

<Core Material 2>

The detail and preferable embodiment and the like of the constitution materials of core material 2 follow those of core film 2 of the above-mentioned sheet 10 in the first form.

To obtain sheet 11 in the second form having an elastomer layer 1 having a Shore A hardness of less than 40 and an adhesion force to stainless steel of not more than 11 oz/in at 90 degree peel strength, the thickness of the core material 2 is preferably 0.5-10 mil, more preferably 2-7 mil. When the thickness of the core material 2 is within such preferable range, the maintenance of a wrapped state of a roll product and handling efficiency as a tape are further improved.

In the sheet 11 in the second form, the thickness of the whole sheet, that is, the total thickness of elastomer layer 1 having a Shore A hardness of less than 40, core material 2 and elastomer layer 1 having a Shore A hardness of less than 40 is preferably 4-90 mil, more preferably 30-80 mil. When the total thickness is within such preferable range, the maintenance of a wrapped state of a roll product 53 and handling efficiency and the like as a sheet are further improved.

<Release Liner 4>

The detail and preferable embodiment and the like of release liner 4 follow those of release liner 4 of the above-mentioned sheet 10 in the first form.

(3) Sheet 12 in the Third Form (Single Layer Sheet Having Only Elastomer Layer 1 Having a Shore A Hardness of Less than 40)

<Elastomer layer 1 having a Shore A hardness of less than 40>

The detail and preferable embodiment and the like of the constitution materials of elastomer layer 1 follow those of elastomer layer 1 of the above-mentioned sheet 10 in the first form.

To obtain sheet 12 in the third form having an elastomer layer 1 having a Shore A hardness of less than 40 and an adhesion force to stainless steel of not more than 11 oz/in at 90 degree peel strength, the thickness of the elastomer layer 1 having a Shore A hardness of less than 40 is preferably 2-40 mil, more preferably 15-35 mil. When the thickness of the elastomer layer 1 is within such preferable range, the maintenance of a wrapped state of a roll product 54 and handling property as a sheet become more superior.

<Release Liner 4>

The detail and preferable embodiment and the like of release liner 4 follow those of release liner 4 of the above-mentioned sheet 10 in the first form.

(4) Sheet 13 in the Fourth Form (Sheet Having Laminate Constitution of Elastomer Layer 1 Having a Shore a Hardness of Less than 40/Core Material 2/Elastomer Layer 1 Having a Shore A Hardness of Less than 40/Substrate 5)
<Elastomer Layer 1 Having a Shore A Hardness of Less than 40>

The detail and preferable embodiment and the like of the constitution materials of elastomer layer 1 on the side separating from substrate 5 and elastomer layer 1 on the side in contact with substrate 5 follow those of elastomer layer 1 of the above-mentioned sheet 10 in the first form.

The thickness of these two elastomer layers 1 is preferably 2-40 mil, more preferably 15-35 mil. When the thickness of the elastomer layer 1 is within such preferable range, the maintenance of a wrapped state of a roll product 56 and handling efficiency as a sheet become further superior.
<Core Material 2>

The detail and preferable embodiment and the like of the constitution materials of core material 2 follow those of core material 2 of the above-mentioned sheet 10 in the first form.

To obtain sheet 13 in the fourth form having an elastomer layer 1 having a Shore A hardness of less than 40 and an adhesion force to stainless steel of not more than 11 oz/in at 90 degree peel strength, the thickness of the core material 2 is preferably 0.5-10 mil, more preferably 1-3 mil. When the thickness of the core material 2 is within such preferable range, the maintenance of a wrapped state of a roll product 55 and handling efficiency as a sheet become more superior.
<Substrate 5>

Having substrate 5, adhesion of sheet 14 to an adherend and peel workability during maintenance can be improved further.

The material of substrate 5 is not particularly limited. Examples thereof include a single layer or laminate plastic film made from one or more kinds selected from polyester (e.g., poly(ethylene terephthalate) (PET) and the like); nylon; polyvinyl chloride; polyvinylidene chloride; polyolefin (e.g., polyethylene, polypropylene, reactor TPO, ethylene-vinyl acetate copolymer and the like); fluororesin (e.g., polytetrafluoroethylene (PTFE), polychlorotrifluoroethylene (PCTFE), polyvinylidene fluoride (PVDF), polyvinyl fluoride (PVF), perfluoroalkoxyfluororesin (PFA), tetrafluoroethylene hexafluoropropylene copolymer (FEP), ethylene tetrafluoroethylene copolymer (ETFE), ethylene chlorotrifluoroethylene copolymer (ECTFE) and the like, a metal foil, and the like. Also, it may be a film obtained by laminating a plastic film and a metal foil. A fiber sheet (a single layer sheet, laminated sheet of two or more layers) such as knitted fabric, woven fabric, non-woven fabric and the like using one or more kinds of fibers selected from synthetic polymer fibers such as polyester (e.g., poly(ethylene terephthalate) (PET) and the like) and the like, natural fibers such as cotton, hemp and the like, metal fiber and glass fiber, and a laminated sheet wherein one or more kinds of such fiber sheets are laminated on the aforementioned plastic film can also be used as a substrate.

The thickness of substrate 5 is preferably 0.5-10 mil, more preferably 2-7 mil. When the thickness of the substrate is within such preferable range, adhesion of sheet 13 to an adherend and peel workability during maintenance can be improved further.

In the sheet 13 in the fourth form, the thickness of the whole sheet, that is, the total thickness of elastomer layer 1 having a Shore A hardness of less than 40, core material 2, elastomer layer 1 having a Shore A hardness of less than 40 and substrate 5 is preferably 5-100 mil, more preferably 30-80 mil. When the total thickness is within such preferable range, the maintenance of a wrapped state of a roll product 55 and handling efficiency and the like as a sheet are further improved.
<Release Liner 4>

The detail and preferable embodiment and the like of release liner 4 follow those of release liner 4 of the above-mentioned sheet 10 in the first form.

(6) Sheet 14 in the Fifth Form (Sheet Having Laminate Constitution of Elastomer Layer 1 Having a Shore a Hardness of Less than 40/Substrate 5)
<Elastomer layer 1 having a Shore A hardness of less than 40>

The detail and preferable embodiment and the like of the constitution materials of elastomer layer 1 follow those of elastomer layer 1 of the above-mentioned sheet 10 in the first form.

To obtain sheet 14 in the fifth form having an elastomer layer 1 having a Shore A hardness of less than 40 and an adhesion force to stainless steel of not more than 11 oz/in at 90 degree peel strength, the thickness of the elastomer layer 1 having a Shore A hardness of less than 40 is preferably 2-40 mil, more preferably 15-35 mil. When the thickness of the elastomer layer 1 having a Shore A hardness of less than 40 is within such preferable range, the maintenance of a wrapped state of a roll product 56 and handling efficiency as a sheet are further improved.
<Substrate 5>

The detail and preferable embodiment and the like of the constitution materials of substrate 5 follow those of substrate 5 of the above-mentioned sheet 13 in the fourth form.

In the sheet 14 in the fifth form, the thickness of the whole sheet, that is, the total thickness of elastomer layer 1 having a Shore A hardness of less than 40 and substrate 5 is preferably 2.5-50 mil, more preferably 17-42 mil. When the total thickness is within such preferable range, the maintenance of a wrapped state of a roll product 56 and handling efficiency and the like as a sheet are further improved.
<Release Liner 4>

The detail and preferable embodiment and the like of release liner 4 follow those of release liner 4 of the above-mentioned sheet 10 in the first form.

The sheet of the present invention does not easily absorb moisture and has preferable property for achieving moisture-proof and/or anticorrosion by adhesion to an adherend. That is, the sheet of the present invention shows a moisture absorption percentage of not more than 2.5% (preferably not more than 1.0%) as measured according to ASTM D570.
[Production Method of Sheet]

The production method of the sheet of the present invention is not particularly limited and the sheet can be produced, for example, by the following method. In the following description, the "step liner" means a liner (sheet, film) used in the production step, which is not included in the final product (the sheet of the present invention).

In the case of a sheet in the first form (FIGS. 1(A) and 1(B)), it is produced via the following first step and second step.

First step: An elastomer layer 1 is formed on a core material 2 by coating, and a release liner 4 (at least one face is release-treated) is laminated thereon.

Second step: A pressure-sensitive adhesive layer 3 is formed on a step liner by coating, and the pressure-sensitive adhesive layer 3 is laminated on the back face of the core material 2 that went through the first step.

The press condition for lamination is preferably about 5-7 kgf/cm$^2$. Thereafter, one of the release liners (step liner) is peeled off, and the sheet is wound up in a roll such that the forming face of the pressure-sensitive adhesive layer 3 contacts the release-treated face of at least one face and the other release liner 4, that is, pressure-sensitive adhesive layer 3 being the inside, and the elastomer layer 1 and the release liner 4 being the outside.

In the case of a sheet in the first form (FIGS. 2(A) and 2(B)), it is produced via the following first step and second step.

First step: An elastomer layer 1 is formed on a core 2 by coating, and a step liner is laminated on elastomer layer 1 as necessary.

Second step: A pressure-sensitive adhesive layer 3 is formed on a release liner 4 (at least one face is release-treated), the pressure-sensitive adhesive layer 3 is laminated on the back face of the core material 2 that went through the first step, the step liner is peeled off as necessary, and the sheet is rolled up.

The press condition for lamination is preferably about 5-7 kgf/cm$^2$. Thereafter, one of the release liners (step liner) is peeled off, and the sheet is wound up in a roll with single face on the opposite side from the forming face of the pressure-sensitive adhesive layer 3 of the other release liner 4 being the outside face and the elastomer layer 1 being the inside face.

In the case of a sheet 11 in the second form (FIGS. 3(A) and 3(B)), it is produced via the following first step and second step.

First step: An elastomer layer 1 is formed by coating on a core 2 by coating, and a step liner is adhered.

Second step: The elastomer layer 1 is coated on the back face of the core 2 that went through the first step, a release liner 4 (at least one face is release-treated, and double faces have different peel forces) is adhered, the step liner is peeled off, and the sheet is rolled up.

The press condition for lamination is preferably about 5-7 kgf/cm$^2$. Thereafter, one of the release liners is peeled off, and the sheet is wound up in a roll with a single face of the other release liner on the opposite side from the forming face of the elastomer layer 1 having a Shore A hardness of less than 40 being the outside face.

In the case of a sheet 12 in the third form (FIGS. 4(A) and 4(B)), an elastomer layer 1 having a Shore A hardness of less than 40 is formed on a single face of a release liner (double faces are release-treated), and the sheet is wound up in a roll with the single face of the release liner on the opposite side from the forming face of the elastomer layer 1 having a Shore A hardness of less than 40 being the outside face.

In the case of a sheet 13 in the fourth form (FIGS. 5(A) and 5(B)), a release liner is prepared, an elastomer layer 1 having a Shore A hardness of less than 40 is formed on a single face of the release liner, and a core 2 is adhered to the elastomer layer 1. Then, an elastomer layer 1 having a Shore A hardness of less than 40 is formed on one single face (single face without release treatment, or single face after adhesion improving treatment in the case of low adhesive substrate) of substrate 5 that went through a release-treatment of the other single face (back face), and the elastomer layer 1 having a Shore A hardness of less than 40 is press laminated on the single face of core 2. The press condition therefor is preferably about 5-7 kgf/cm$^2$. Thereafter, the release liner is peeled off, and the sheet is wound up in a roll with the release-treated single face of the substrate 5 being the outside face.

In the case of a sheet 14 in the fifth form (FIGS. 6(A) and 6(B)), an elastomer layer 1 having a Shore A hardness of less than 40 is formed on one single face (single face without release treatment, or single face after adhesion improving treatment in the case of low adhesive substrate) of substrate 5 that went through a release-treatment of the other single face (back face), and the sheet is wound up in a roll with the release-treated single face of the substrate 4 being the outside face.

The present invention is explained in more detail in the following by referring to Examples and Comparative Examples, which are not to be construed as limitative.

The property measurement test and property evaluation in the Examples and Comparative Examples are as follows.

1. Shore a Hardness

The aforementioned method.

2. 90 Degree Peel Strength

The aforementioned method.

3. Moisture Absorption Percentage

According to ASTM D570. That is, a sheet is cut into a 10 inch length×1 inch width and the sample was adhered to an aluminum board. The board is stood at room temperature for 24 hr and the weight was measured (initial value). The sample is preserved in a chamber at 49° C., humidity 95% for 7 days. After completion of the preservation, water drops on the surface are removed with dried gauze and the weight was measured (final value). The percentage of difference between the final value and the initial value relative to thus-measured initial value is taken as a moisture absorption percentage. The moisture absorption percentage was determined for 5 samples, and the average thereof was taken as an evaluation value.

4. Corrosion Resistance Test (Adhesion Evaluation Test)

A sheet is cut into a 3 inch×3 inch flat plane size, and adhered to a 4 inch×4 inch (flat plane size) aluminum panel. After one reciprocation with a 2 kg roller, the sheet is aged for 24 hr at ambient temperature to give a test sample.

The sample was subjected to a salt water spray test under the following conditions.

salt water spray test (according to ASTM B117)
sample set angle: 30°
temperature: 35+1.1-1.7° C.
salt water concentration: 5 wt %
spray amount: 1.5 ml/80 cm$^2$/hr
test time: 250 hr, 500 hr Seal performance evaluation: After the test, the sheet is detached from the aluminum panel, and the ratio of the corroded area to the whole area of the region, to which the sheet has been adhered, is determined. When a corroded part is not less than 1%, the sheet is evaluated as disqualified, and when the corroded part is less than 1%, the sheet is evaluated as qualified. The corrosion was determined by visual observation.

5. Removability Test

To the top face (after peeling release liner) of a sample similar to that in the corrosion resistance test is pressed the same size of an aluminum panel to prepare a sandwich-shaped test sample. The test sample is aged for 24 hr at room temperature, heated in an oven at 70° C. for 48 hr, taken out and the panel is peeled off 30 min later. The evaluation criteria are as follows.

Good: Sheet can be peeled off easily with hand without using special tool or method. No adhesive residue after peeling the sheet from the panel.

Acceptable: Peeling off from the panel only with hand is difficult and can be peeled off only by expanding the gap with a screwdriver and the like. No adhesive residue after peeling the sheet from the panel.

Bad: Peeling off from the panel only with hand is difficult and can be peeled off only by expanding the gap with a screwdriver and the like. Adhesive residue is present after peeling the sheet from the panel.

Examples 1-3, Comparative Examples 1-4

(Materials Used)
1. Elastomer Composition
   SILBIONE LSR 6301 A/B manufactured by Bluestar Silicones, A:B=100:100 (parts by weight)
   SILBIONE LSR 6305 A/B manufactured by Bluestar Silicones, A:B=100:100 (parts by weight)
   LR 3003/30 A/B manufactured by ELASTOSIL, A:B=100:100 (parts by weight)
   KE1100 A/B manufactured by Shin-Etsu Silicone, A:B=100:100 (parts by weight)
   SE4400 A/B manufactured by Dow Corning Toray, A:B=100:100 (parts by weight)
   Note 1) All elastomer compositions were of two-component curing type, and equal amounts of component A and component B were blended.
2. Pressure-Sensitive Adhesive
(Polyoxyalkylene-Based Adhesive)
   base compound: SILYL ACX022*[1] manufactured by KANEKA, 100 parts by weight
   flame retardant 1: FRCROS486*[2] manufactured by BUDENHEIM, 50 parts by weight
   flame retardant 2: TCP*[3] manufactured by Rit-Chem, 30 parts by weight
   tackifier: PENSEL D-125*[4] manufactured by Arakawa Chemical Industries, 20 parts by weight
   crosslinking agent: SILYL CR500*[5] manufactured by KANEKA, 7.65 parts by weight
   catalyst: PT-56003P (3% Pt-VTS-IPA Solution)*[6] manufactured by AB Specialty Silicones, 0.1 part by weight
   reaction control agent: 3-Methyl-1-butyn-3-ol manufactured by TCI America, 0.05 parts by weight
   1) terminal allylated polyoxypropylene wherein an allyl group is bonded to both terminals of polypropyleneglycol having an average molecular weight of about 28000
   2) silane-coated product of ammonium polyphosphate
   3) tricresyl phosphate
   4) rosin ester resin
   5) hydrogen siloxane-based compound having 5 hydrosilyl groups on average in a molecule
   6) isopropanol-diluted liquid of divinyltetramethyldisiloxane platinum complex
(Polyurethane-Based Adhesive)
   Hi-TAK HT3935 manufactured by AV-DEC
3. PTFE Film
   thickness 5 mil, double face Na etching treatment
4. Preparation of Sheets Examples 1-3, Comparative Examples 1, 2

(1) An elastomer composition was applied to one of the single faces of PTFE film, dried in an oven at 130° C. for 3 min (thickness after drying 30 mil), and a release liner (S2 CL PET 5100/5100 manufactured by Loparex) was laminated with a hand roller.
(2) A pressure-sensitive adhesive was applied to a single face of the same another release liner, dried in an oven at 130° C. for 3 min (thickness after drying 20 mil), and the obtained pressure-sensitive adhesive layer was laminated on the other single face of the PTFE film of (1) with a hand roller.

Comparative Examples 3, 4

The elastomer composition in the above-mentioned (1) was changed to polyoxyalkylene-based adhesive or polyurethane-based adhesive, and the above-mentioned (1) and (2) were performed.

The test results are shown in Table 1.

TABLE 1

| | | Example 1 | Example 2 | Example 3 | Comparative Ex 1 | Comparative Ex 2 | Comparative Ex 3 | Comparative Ex 4 |
|---|---|---|---|---|---|---|---|---|
| 1st layer | Material | LSR 6301 | SR 6305 | LS 3003/30 | KE-1100 | SE 4400 | Polyoxyalkylen | Polyurethane |
| | Shore A Hardness | 1 | 5 | 30 | 40 | 78 | — | — |
| | Thickness [mil] | 30 | 30 | 30 | 30 | 30 | 20 | — |
| Core film | Material | PTFE | PTFE | PTFE | PTFE | PTFE | PTFE | Mesh |
| | Thickness [mil] | 5 | 5 | 5 | 5 | 5 | 5 | — |
| 2nd layer | Material | Polyoxyalkylen | Polyoxyalkylen | Polyoxyalkylen | Polyoxyalkylen | Polyoxyalkylen | Polyoxyalkylen | Polyurethane |
| | Thickness [mil] | 20 | 20 | 20 | 20 | 20 | 20 | — |
| | Total Thickness [mil] | 55 | 55 | 55 | 55 | 55 | 45 | 45 |
| | Adhesion (1st layer) [oz/in] | 2.31 | 2.26 | 1.28 | 0.94 | 0.81 | 8.86 | 11.02 |
| | Moisture Absorption [%] | 0.19 | 0.22 | 0.32 | 0.02 | 0.20 | 1.00 | 0.14 |
| | 250 hr Salt Spray | PASS | PASS | PASS | FAIL | FAIL | PASS | PASS |
| | 500 hr Salt Spray | PASS | PASS | PASS | — | — | PASS | PASS |
| | Removability | Good | Good | Good | Good | Good | Acceptable | Bad |

The invention claimed is:

1. A method of moisture-proofing an adherend, comprising adhering a sheet comprising an elastomer layer to the adherend with the elastomer layer of the sheet as an adhesive surface to the adherend, wherein the elastomer layer has a Shore A hardness of less than 40 and an adhesion force to stainless steel of not more than 11 oz/in at 90 degree peel strength, wherein the adherend is at least one adherend selected from the group consisting of a floor panel and a constructional material in a transporter or structure, and wherein the elastomer layer is a silicone rubber layer or urethane rubber layer having a Shore A hardness of less than 40.

2. The method according to claim 1, wherein the sheet comprises, in the following order, the elastomer layer, and further comprises a core material layer and a pressure-sensitive adhesive layer.

3. The method according to claim 2, wherein the sheet further comprises a release liner laminated on the elastomer layer.

4. The method according to claim 2, wherein the sheet further comprises a release liner laminated on the pressure-sensitive adhesive layer.

5. The method according to claim 2, wherein the core material layer is a plastic film.

6. The method according to claim 2, wherein the core material layer is a nonporous film.

7. The method according to claim 2, wherein the core material layer is a fluororesin film.

8. The method according to claim 1, wherein the sheet comprises the elastomer layer, and further comprises a core material layer and a second elastomer layer having a Shore A hardness of less than 40.

9. The method according to claim 8, wherein the sheet further comprises a release liner laminated on one of the elastomer layer and the second elastomer layer.

10. The method according to claim 8, wherein the sheet further comprises a substrate laminated on one of the elastomer layer and the second elastomer layer.

11. The method according to claim 8, wherein the core material layer is a plastic film.

12. The method according to claim 8, wherein the core material layer is a nonporous film.

13. The method according to claim 8, wherein the core material layer is a fluororesin film.

14. The method according to claim 2, wherein the pressure-sensitive adhesive layer is a polyoxyalkylene-based adhesive layer.

15. The method according to claim 1, further comprising, after the adhering, peeling the sheet from the adherend and performing the method using the peeled sheet or using a newly prepared sheet comprising an elastomer layer having a Shore A hardness of less than 40 and an adhesion force to stainless steel of not more than 11 oz/in at 90 degree peel strength.

16. A method of corrosion-proofing a metal plate, comprising adhering a sheet comprising, in the following order, an elastomer layer, a core material layer and pressure-sensitive adhesive layer, to the metal plate with the elastomer layer of the sheet as an adhesive surface to the metal plate, wherein the elastomer layer has a Shore A hardness of less than 40 and an adhesion force to stainless steel of not more than 11 oz/in at 90 degree peel strength, to obtain a corrosion-proofed metal plate.

* * * * *